United States Patent
Nishijima et al.

[11] Patent Number: 5,817,436
[45] Date of Patent: Oct. 6, 1998

[54] LITHIUM NICKEL COMPOSITE OXIDE PREPARATION PROCESS THEREFOR AND APPLICATION THEREOF

[75] Inventors: Motoaki Nishijima, Gose; Takehito Mitate, Yamototakada, both of Japan

[73] Assignee: Sharp Kabushiki Kaisha, Osaka, Japan

[21] Appl. No.: 810,384

[22] Filed: Mar. 3, 1997

[30] Foreign Application Priority Data

Mar. 5, 1996 [JP] Japan .................................. 8-047329
Mar. 5, 1996 [JP] Japan .................................. 8-047330

[51] Int. Cl.$^6$ .............................. H01M 4/48; H01M 6/14
[52] U.S. Cl. .......................... 429/194; 429/218; 429/223
[58] Field of Search .................................... 429/218, 223, 429/194

[56] References Cited

U.S. PATENT DOCUMENTS 5,378,560   1/1995   Tomiyama ............................... 429/217
5,591,548   1/1997   Mao ........................................ 429/218

FOREIGN PATENT DOCUMENTS 96 41385A   12/1996   WIPO.

OTHER PUBLICATIONS

Pickering et al, "A Neutron Powder Diffraction Study of the Ordering In LIXNI XO", vol. 53–56, No. PART 01, 1 Jul. 1992, pp. 405–412, XP000399121.

Davidson et al, "Short Range and Long Range Magnetic Order in 1T–Li$_2$NiO$_2$", JOurnal of Solid State Chemistry 105, (1993), pp. 410–416 (Month N/K).

Davidson et al, "Structure of 1T–Li$_2$NiO$_2$ from Powder Neutron Diffraction", Solid State Ionics 46 (1991), pp. 243–247 (Month N/K).

Dahn, "Structure and Electrochemistry of Li$_{1\pm y}$ Phase With the Ni(OH)$_2$ Structure", Solid State Ionics 44 (1990), pp. 87–97 (Month N/K).

*Primary Examiner*—Anthony Skapars
*Attorney, Agent, or Firm*—Nixon & Vanderhye P.C.

[57] ABSTRACT

The present invention provides a novel lithium nickel composite oxide represented by the composition formula (I):

$$Li_{2+x}Ni_{1-x}O_{2+y}(0.0 \leq x \leq 1/7,\ 0.0 \leq y < 0.3,\ \text{excluding the case where } x=y=0)$$  (I), a preparation process therefor and applications thereof. Where the lithium nickel composite oxide is used as a positive-electrode active material for a nonaqueous secondary battery, high capacity charge-discharge characteristics can be ensured. The novel lithium nickel composite oxide of the present invention is promising as a catalyst, an adsorbent, a dielectric material, and a magnetic material besides such a battery material.

11 Claims, 27 Drawing Sheets

LITHIUM NICKEL COMPOSITE OXIDE PREPARATION PROCESS THEREFOR AND APPLICATION THEREOF

BACKGROUND OF THE INVENTION

1. Field of the Invention

The present invention relates to a novel lithium nickel composite oxide and a preparation process therefor. The lithium nickel composite oxide of the present invention is particularly useful as a positive-electrode active material for a nonaqueous secondary battery, which is capable of charging and discharging at a high capacity and is excellent in the cycle characteristics. The lithium nickel composite oxide is expected to be useful as a catalyst, an adsorbent, a dielectric material and a magnetic material besides such a battery material.

2. Description of the Related Arts

Secondary batteries are widely used as power sources for portable systems because of their cost efficiency and the like. There are many kinds of secondary batteries. Nickel-cadmium batteries are currently the most popular, and nickel-hydride batteries are becoming more and more prevalent. In recent years, lithium secondary batteries utilizing a lithium-based active material have been put in practical use as they can offer a higher output potential and a higher energy density than the aforesaid secondary batteries, and have been under intensive study for further improvement of the performance thereof. One positive-electrode material currently commercially available for the lithium secondary batteries is $LiCoO_2$, but cobalt as a material for $LiCoO_2$ is expensive. On the other hand, a lithium nickel composite oxide prepared by using a nickel-based material which is less expensive than cobalt has the same crystalline structure and exhibits substantially the same electrochemical behavior as $LiCoO_2$. Therefore, the lithium nickel composite oxide is considered to be a next-generation positive-electrode material for the lithium secondary batteries.

$LiNiO_2$ is the most stable among known lithium nickel composite oxides, and can be relatively easily synthesized. Nickel is present in a state of $Ni^{3+}$ ions in $LiNiO_2$ crystal. Where $LiNiO_2$ is used for a positive-electrode, lithium ions are electrochemically extracted from the crystal by charging the positive-electrode. At this time, the nickel ions are oxidized from $Ni^{3+}$ to $Ni^{4+}$. Since the highest oxidation number of nickel is 4+, $Ni^{4+}$ ions cannot be oxidized any more. Even if lithium ions are all electrochemically extracted from the crystal by the charging, the electric capacity will not exceed 1 electrochemical equivalent (i.e., a theoretical capacity of 274.6 mAh/g).

Where a lithium secondary battery utilizing $LiNiO_2$ as a positive-electrode active material thereof is operated, the capacity of the positive-electrode is typically only about one half the theoretical capacity. Although about 70% to about 80% of the theoretical capacity may be electrochemically available, the cycle characteristics of the positive-electrode is drastically deteriorated, making the secondary battery impractical. $LiNiO_2$ is of a so-called layer structure consisting of Li layers and NiO layers. If too many lithium ions are extracted from the lithium layers, the repulsion between the NiO layers is increased, making it impossible to maintain the crystalline structure. In addition, when lithium ions are extracted, nickel ions migrate from the NiO layers to vacant lithium sites in the Li layers so that diffusion of the lithium ions is prevented to reduce the capacity of the positive-electrode.

Although various attempts have been made to overcome this problem, no fundamental improvement has been made because the problem comes from the basic crystalline structure of $LiNiO_2$. Therefore, a novel positive-electrode active material is desired as an alternative to the prior art lithium nickel composite oxide, which suffers the aforesaid fundamental problem, to afford a lithium secondary battery excellent in the battery characteristics, particularly having a high capacity.

Known examples of specific negative-electrode materials for the lithium secondary battery include metal lithium, lithium alloys such as lithium aluminum alloys, carbon materials, lithium ion insertable and releasable material including conductive polymers such as polyacetylene, polythiophene and polyparaphenylene, transition metal oxides, transition metal sulfides, transition metal nitrides, lithium transition metal oxides, lithium transition metal sulfides and lithium transition metal nitrides, which may be used either alone or in combination. Metal lithium and lithium aluminum alloys exhibit a high capacity per unit weight to afford a high energy density secondary battery. However, the use of metal lithium or a lithium aluminum alloy entails generation of so-called "dendrite" (branching tree-like crystal) on the surface of the negative-electrode during repeated charge-discharge cycles. The dendrite grows to come into contact with the positive-electrode, resulting in a short circuit within the secondary battery. This may entail a fire in the worst case. Therefore, it is desirable to use negative-electrode materials other than the lithium aluminum alloys and metal lithium, which utilize a lithium ion insertion and release reaction for the secondary battery. Among the aforesaid negative-electrode materials, the carbon materials are considered to be the most promising in consideration of the energy density and cost.

SUMMARY OF THE INVENTION

To overcome the aforesaid problem, the inventors of the present invention conducted researches into a novel material as an alternative to the prior art positive-electrode material of $LiNiO_2$. In an attempt to generate an electrochemical energy from an electrode active material, a greater quantity of lithium ions or alkali metal ions should electrochemically be released from the electrode active material to increase the energy density. If too many constituent ions of the crystal of the active material are released therefrom, however, the original crystalline structure cannot be maintained thereby to collapse. This results in a reduced capacity. The inventors considered that an electrode active material containing a greater quantity of lithium ions or alkali metal ions would be free from the collapse of the crystalline structure thereof which might otherwise be caused by the release of the ions, and that an electrode material utilizing such an electrode active material could exhibit a high energy density thereby to overcome the aforesaid problem.

As a result of intensive studies on various compounds in view of the aforesaid point, the inventors have found that a novel lithium nickel composite oxide represented by $Li_{2+x}Ni_{1-x}O_{2+y}$ ($0.0 \leq x \leq 1/7$, $0.0 \leq y < 0.3$, excluding the case where $x=y=0$) and having a crystalline structure different from $LiNiO_2$ can be synthesized through a solid state reaction and is a promising electrode material. The novel lithium nickel composite oxide has an unprecedented crystalline structure and exhibites a higher capacity than positive-electrode active materials of the prior art.

In accordance with one aspect of the present invention, there is provided a lithium nickel composite oxide represented by the composition formula (I):

$$Li_{2+x}Ni_{1-x}O_{2+y} (0.0 \leq x \leq 1/7, 0.0 \leq y < 0.3, \text{ excluding the case where}$$

x=y=0)    (I)

In accordance with another aspect of the present invention, there is provided a process for preparing a lithium nickel composite oxide, which comprises mixing one or more lithium materials selected from the group consisting of metal lithium, lithium oxide, lithium peroxide, lithium sulfide, lithium nitride, lithium fluoride, lithium chloride, lithium bromide, lithium iodide, lithium hydroxide, lithium nitrate, lithium carbonate, lithium formate, lithium acetate, lithium benzoate, lithium citrate, lithium lactate, lithium oxalate, lithium pyruvate, lithium stearate and lithium tartrate with one or more nickel materials selected from the group consisting of nickel acetate, nickel amidosulfonate, diammonium nickel (II) sulfate (hexahydrate), nickel benzoate, nickel bromide, basic nickel carbonate, nickel carbonyl, nickel chloride, nickel citrate, nickel cyanide, nickel diphosphate, nickel 2-ethylhexanate, nickel fluoride, nickel formate, nickel hydroxide, nickel hypophosphite, nickel iodide, nickel lactate, nickel naphthenate, nickel nitrate, nickel oleate, nickel oxalate, nickel monoxide, dinickel trioxide, nickel perchlorate, nickel phosphate, nickel phosphinate, nickel pyrophosphate, nickel stearate, nickel sulfate, nickel sulfide, nickel tartrate and metal nickel; and calcing the resulting mixture in an atmosphere of an inert gas, to obtain a lithium nickel composite oxide of the formula(I).

In accordance with further another aspect of the present invention, there is provided a positive-electrode active material comprising the lithium nickel composite oxide represented by the composition formula (I).

In accordance with still another aspect of the present invention, there is provided a nonaqueous secondary battery comprising a positive-electrode containing the lithium nickel composite oxide represented by the composition formula (I) as a positive-electrode active material a negative-electrode containing metal lithium or a lithium absorbable and desorbable material and an ion conductor.

DETAILED DESCRIPTION OF THE PREFERRED EMBODIMENTS

Figure 1:
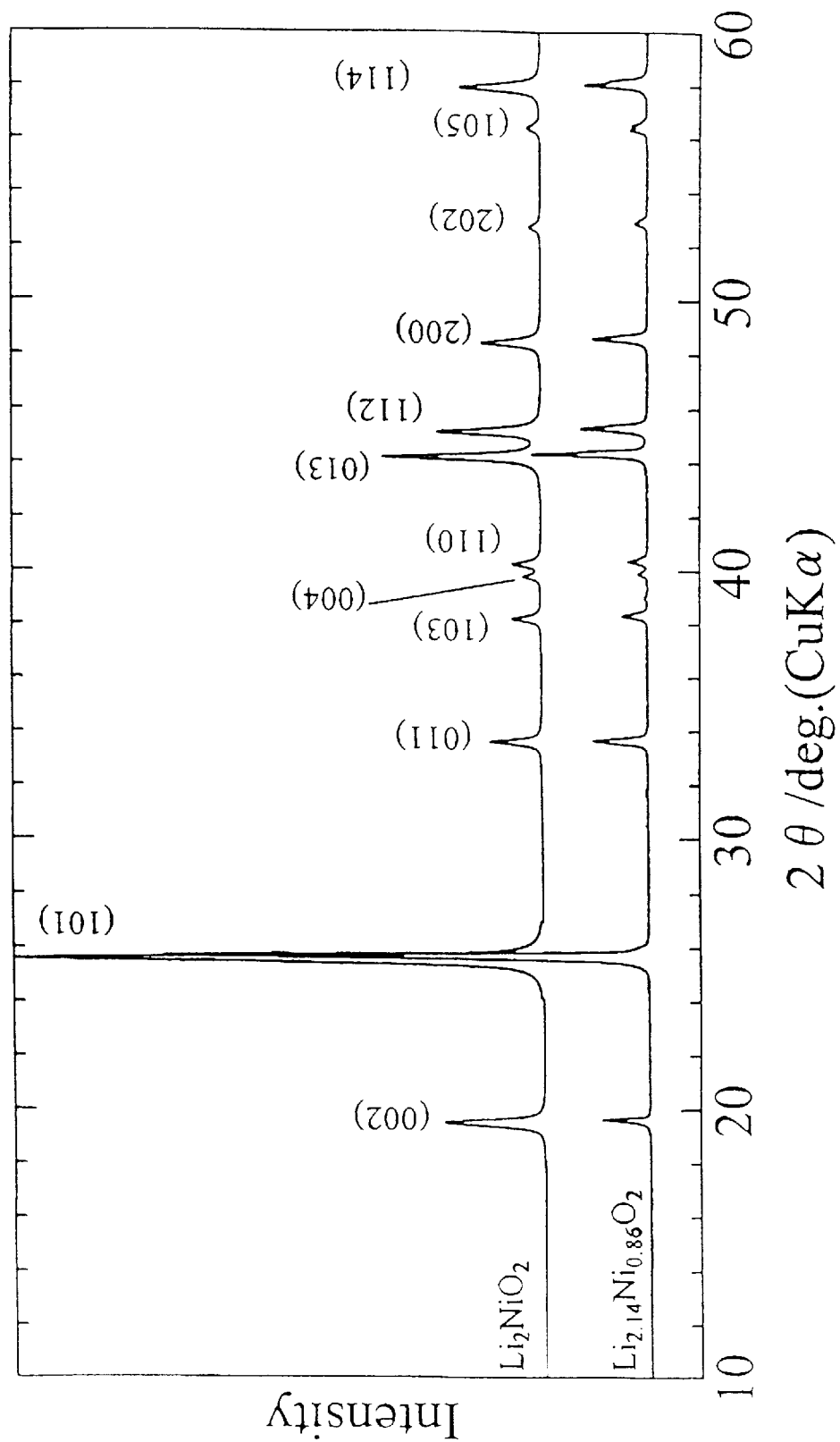
FIG. 1 is an X-ray diffraction patterns of $Li_2NiO_2$ and $Li_{2.14}Ni_{0.86}O_2$ according to the present invention.

The lithium nickel composite oxide according to the present invention includes compounds represented by the supplementary formulae (II) and (III):

$Li_{2+x'}Ni_{1-x'}O_2 (0.0<x'\leq 1/7)$    (II)

$Li_2NiO_{2+y'} (0.0<y'<0.3)$    (III)

The lithium nickel composite oxide $Li_{2+x'}Ni_{1-x'}O_2$ $(0.0<x'\leq 1/7)$ contains lithium ions more than twice as many as nickel ions in its crystalline structure. The average valence of the nickel ions is between 2+ and 4+. Since the nickel ions can have a valence of 2+ to 4+, $Li_{2+x'}Ni_{1-x'}O_2$ $(0.0<x'\leq 1/7)$ can electrochemically release 1.0 to 2.0 lithium ions. In the case of $Li_{2.14}Ni_{0.86}O_2$ (x'=1/7), for example, the release of one lithium ion per molecule affords a capacity of about 275 mAh/g, and the release of two lithium ions per molecule affords a capacity of about 550 mAh/g. In the case of $LiNiO_2$, complete release of lithium ions affords a capacity of about 275 mAh/g, only about half of which is put in actual use. The lithium nickel composite oxide $Li_{2+x'}Ni_{1-x'}O_2$ $(0.0<x'\leq 1/7)$ of the present invention exhibits a high capacity, i.e., about 275 mAh/g, even if only half of the lithium ions therein are utilized.

The lithium nickel composite oxide $Li_2NiO_{2+y'}$ ($0.0<y'<0.3$) also contains lithium ions twice as many as nickel ions in its crystalline structure. The average valence of the nickel ions is between 2+ and 2.6+. Since the nickel ions can have a valence of 2+ to 4+, $Li_2NiO_{2+y'}$ ($0.0<y'<0.3$) can electrochemically release 1.4 to 2.0 lithium ions per molecule. In the case of $Li_2NiO_{2.25}$ ($y'=0.25$), for example, the release of one lithium ion per molecule affords a capacity of about 245 mAh/g, and the release of two lithium ions per molecule affords a capacity of about 490 mAh/g. In the case of $LiNiO_2$, complete release of lithium ions affords a capacity of about 275 mAh/g, only about half of which is put in actual use, as described above. The lithium nickel composite oxide $Li_2NiO_{2+y'}$ ($0.0<y'<0.3$) of the present invention exhibits a high capacity, i.e., about 245 mAh/g, even if only half of the lithium ions therein are utilized.

The known lithium nickel composite oxide $Li_2NiO_2$ is similar in the composition to the lithium nickel composite oxides of the present invention. Although it has been reported that $Li_2NiO_2$ is obtained by electrochemically inserting lithium ions into $LiNiO_2$ (H. Rieck et.al., Z. Anorg. Allg. Chem., 392 (1972) 193; J. R. Dahn et.al., Solid State Ionic 44 (1990) 87; I. Davidson et.al., Solid State Ionics 46 (1991); I. J. Davidson et.al., Solid State Chem., 105 (1993) 410), the synthesis of $Li_2NiO_2$ by a solid phase method has not been reported. The lithium nickel composite oxides of the present invention are similar to but different from $Li_2NiO_2$ in the crystalline structure and, therefore, are novel compounds having a Li/Ni ratio different from $Li_2NiO_2$ or having a greater number of oxygen than $Li_2NiO_2$.

Figure 2:
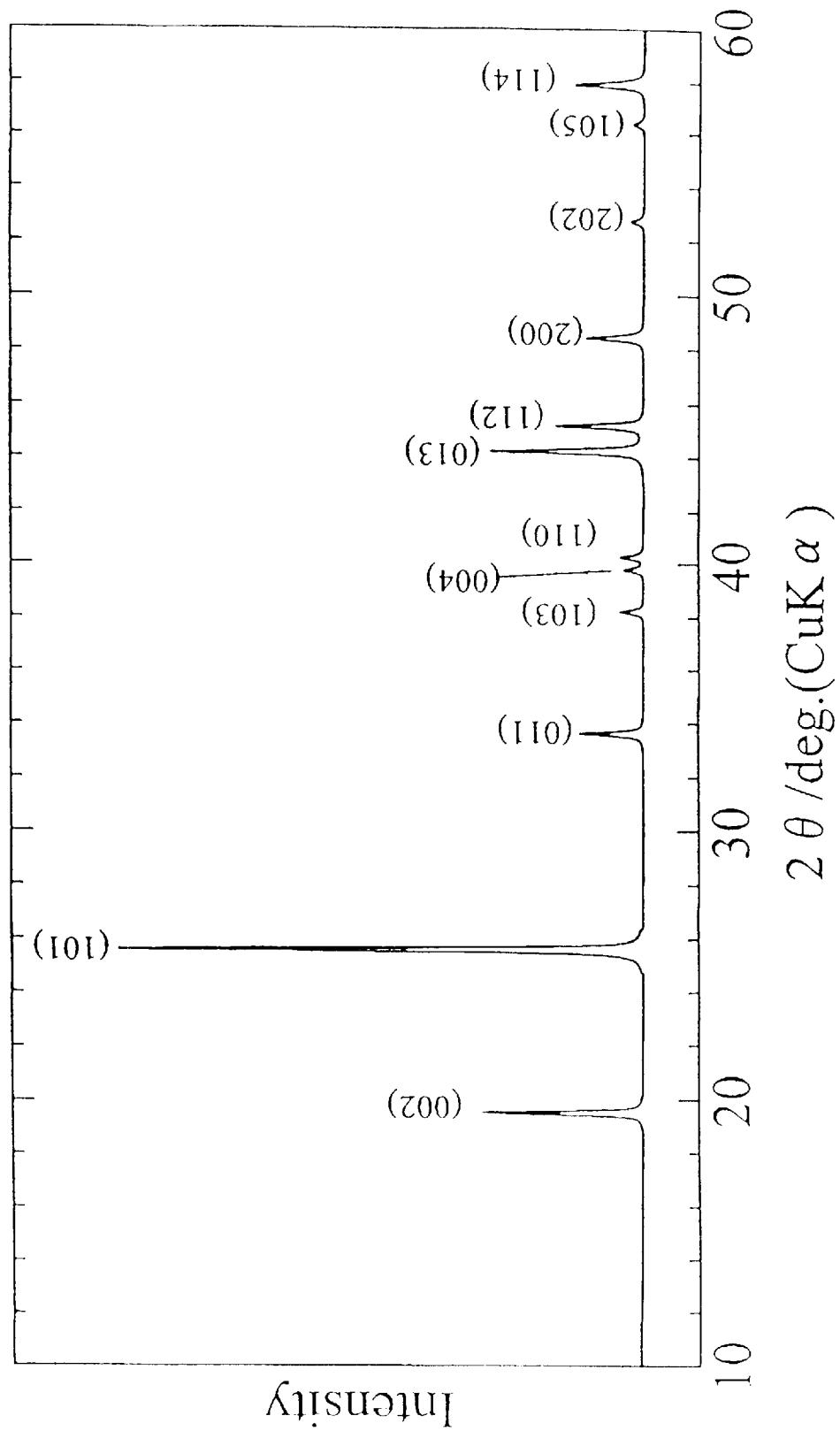
FIG. 2 is an X-ray diffraction pattern of $Li_2NiO_{2+y}$ according to the present invention.

The lithium nickel composite oxides $Li_{2+x'}Ni_{1-x'}O_2$ ($0.0<x'\leq 1/7$) and $Li_2NiO_{2+y'}$ ($0.0<y'<0.3$) according to the present invention each have an X-ray diffraction pattern similar to a reported X-ray pattern of $Li_2NiO_2$ (JCPDS card 26-1175). The X-ray patterns of $Li_{2.14}Ni_{0.86}O_2$, $Li_2NiO_2$ and $Li_2NiO_{2+y'}$ are shown in FIGS. 1 and 2, which were determined by the X-ray powder diffractometry utilizing CuK α beam generated by a radiation source of a Cu-targeted enclosure X-ray tube.

The X-ray diffraction patterns of $Li_{2+x'}Ni_{1-x'}O_2$ ($0.0<x'\leq 1/7$) and $Li_2NiO_{2+y'}$ ($0.0<y'<0.3$) each have peaks at $2\theta$ (°)=19.6±0.5, 25.6±0.5, 44.3±0.5, 45.3 ±0.5, 48.5±0.5 and 58.0±0.5 with peak intensities of 20 to 35, 100, 28 to 35, 18 to 22, 10 to 14, and 17 to 20. It is noted that the peak intensities are normalized with the maximum peak intensity at $2\theta$ (°)=25.6±0.5 being regarded as 100. The indexing of these X-ray diffraction patterns indicates that the lithium nickel composite oxides of the present invention belong to the Space Group Immm.

The known lithium nickel composite oxide $Li_2NiO_2$ also belongs to the Space Group Immm, and has lithium at 4j sites, nickel at 2b sites, and oxygen at 4i sites.

An assumptive model (FIG. 3) of the lithium nickel composite oxide $Li_{2+x'}Ni_{1-x'}O_2$ ($0.0<x'\leq 1/7$) of the present invention in which lithium are located at 4j sites, nickel and lithium at 2b sites and oxygen at 4i sites is consistent with a pattern obtained by the Rietveld's X-ray powder structural analysis performed on the basis of the Space Group.

Figure 4:
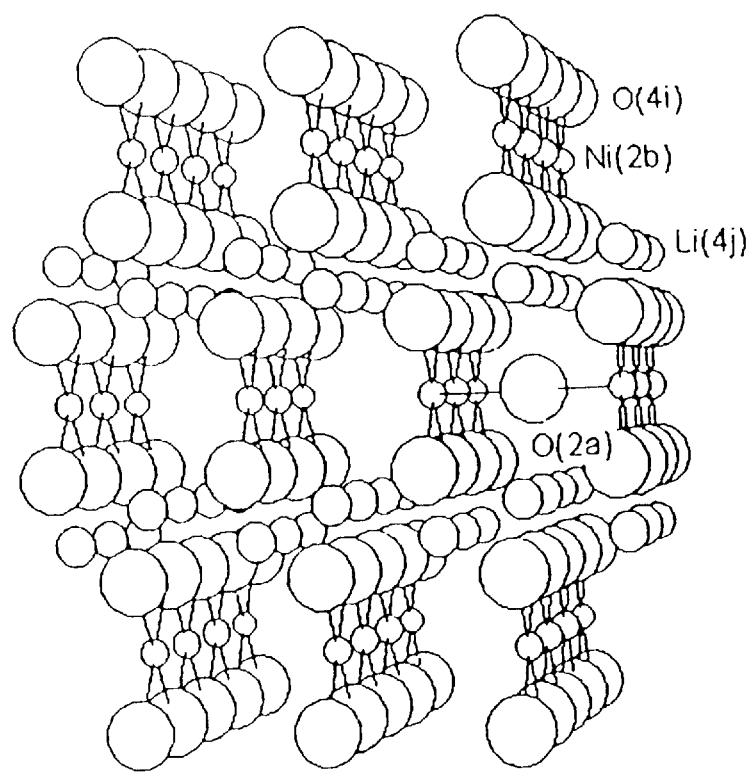
FIG. 4 is a schematic diagram illustrating the basic crystalline structure of $Li_2NiO_{2+y}$ according to the present invention.

The lithium nickel composite oxide $Li_2NiO_{2+y'}$ ($0.0<y'<0.3$) of the present invention has the same basic crystalline structure as $Li_2NiO_2$, in which $NiO_4$ square planer coordination units share their opposite sides to form a linear chain which is located parallel to another linear chain of $NiO_4$ square planer coordination units with their planes facing opposite to each other. The linear chains of $NiO_4$ square planer coordination units form a kind of layer (hereinafter referred to as "$NiO_4$ layer"). Unlike the known lithium nickel composite oxide $Li_2NiO_2$, the lithium nickel composite oxide $Li_2NiO_{2+y'}$ ($0.0<y'<0.3$) of the present invention has oxygen corresponding to "y'" at 2a sites, i.e., at sites between the linear chains of $NiO_4$ square planer coordination units. The 2a sites allow the oxygen to be kept in an electrical balance between nickel in the linear chains of $NiO_4$ square planer coordination units, and are stereochemically optimal to accept excess oxygen. The basic crystalline structure of the lithium nickel composite oxide $Li_2NiO_{2+y'}$ ($0.0<y'<0.3$) of the present invention is shown in FIG. 4. When oxygen are inserted into the 2a sites, an $NiO_4$ square planer coordination unit and an oxygen form a pyramid-like $NiO_5$ pentahedral unit with the oxygen located at the apex thereof. Oxygen at apexes of $NiO_5$ pentahedral units along one linear chain of $NiO_4$ square planer coordination units are shared with $NiO_5$ pentahedral units along another linear chain located parallel to the one linear chain, whereby "an oxygen crosslinked structure" is formed. Thus, the linear chains of $NiO_4$ square planer coordination units are linked to each other, so that a boding force between the $NiO_4$ layers is increased. An assumptive model of the lithium nickel composite oxide $Li_2NiO_{2+y'}$ ($0.0<y'<0.3$) of the present invention in which lithium are located at 4j sites, nickel at 2b sites and oxygen at 4i sites and 2a sites is virtually consistent with a result of the Rietveld analysis performed on $Li_2NiO_{2+y'}$ ($0.0<y'<0.3$) which belongs to the Space Group Immm.

While nickel ions in the known lithium nickel composite oxide $Li_2NiO_2$ each have a valence of 2+, nickel ions in the lithium nickel composite oxide $Li_2NiO_{2+y'}$ ($0.0<y'<0.3$) of the present invention each have a valence of 2+ or greater. Therefore, it is expected that $Li_2NiO_{2+y'}$ ($0.0<y'<0.3$) has a higher electron conductivity than $Li_2NiO_2$.

Lithium are each located between planes of linear chains of $NiO_4$ square planer coordination units, more specifically, at the center of a tetrahedron with four oxygen located at the vertexes thereof. In other words, a layer of $LiO_4$ tetrahedrons is formed. In the case of $LiNiO_2$, lithium are each located between $NiO_6$ layers, and an $LiO_6$ octahedron with six oxygen located at the vertexes thereof is formed. As is apparent from a comparison between tetrahedral sites and octahedral sites in a spinel structure, the tetrahedral sites are more advantageous in terms of lithium diffusion. This means that the Li diffusion rate in $Li_2NiO_{2+y'}$ ($0.0<y'<0.3$) is higher than that in $LiNiO_2$. Therefore, $Li_2NiO_{2+y'}$ ($0.0<y'<0.3$) is expected to exhibit large current charge-discharge characteristics.

Figure 3:
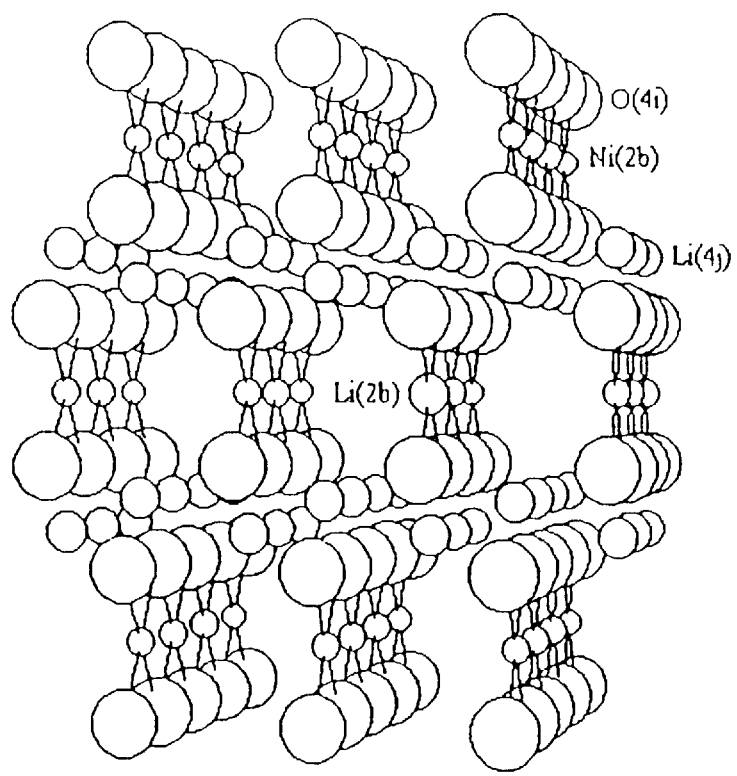
FIG. 3 is a schematic diagram illustrating the basic crystalline structure of $Li_{2.14}Ni_{0.86}O_2$ according to the present invention.

The basic crystalline structure of the lithium nickel composite oxide $Li_{2+x'}Ni_{1-x'}O_2$ ($0.0<x'\leq 1/7$) of the present invention is shown in FIG. 3. The known lithium nickel composite oxide $Li_2NiO_2$ which has lithium at 4j sites, nickel alone at 2b sites and oxygen at 4i sites has a crystalline structure different from that of the lithium nickel composite oxide $Li_{2+x'}Ni_{1-x'}O_2$ ($0.0<x'\leq 1/7$) of the present invention which has lithium ions and nickel at 2b sites.

The crystalline structure of the lithium nickel composite oxide $Li_{2+x'}Ni_{1-x'}O_2$ ($0.0<x'\leq 1/7$) of the present invention is such that $NiO_4$ square planer coordination units or $LiO_4$ square planer coordination units (hereinafter referred to as "(Ni—Li) $O_4$ square planer coordination units") share their opposite sides to form a linear chain which is located parallel to another linear chain of (Ni—Li)$O_4$ square planer coordination units with their planes facing opposite to each other. The linear chains of (Ni—Li) $O_4$ square planer coordination units form a kind of layer (hereinafter referred to as "(Ni—Li)$O_4$ layer". Lithium ions are present between the (Ni—Li)$O_4$ layers.

Lithium are each located between the (Ni—Li)$O_4$ layers, more specifically, at the center of a tetrahedron with four oxygen located at the vertexes thereof. In other words, a layer of $LiO_4$ tetrahedrons is formed. In the case of $LiNiO_2$, lithium are each located between $NiO_6$ layers, and an $LiO_6$ octahedron with six oxygen located at the vertexes thereof is formed. As is apparent from a comparison between tetrahedral sites and octahedral sites in a spinel structure, the tetrahedral sites are more advantageous in terms of lithium diffusion. This means that the Li diffusion rate in $Li_{2+x'}Ni_{1-x'}O_2$ (0.0<x'≦1/7) is higher than that in $LiNiO_2$. Therefore, $Li_{2+x'}Ni_{1-x'}O_2$ (0.0<x'≦1/7) is expected to exhibit large current charge-discharge characteristics.

Figure 5:
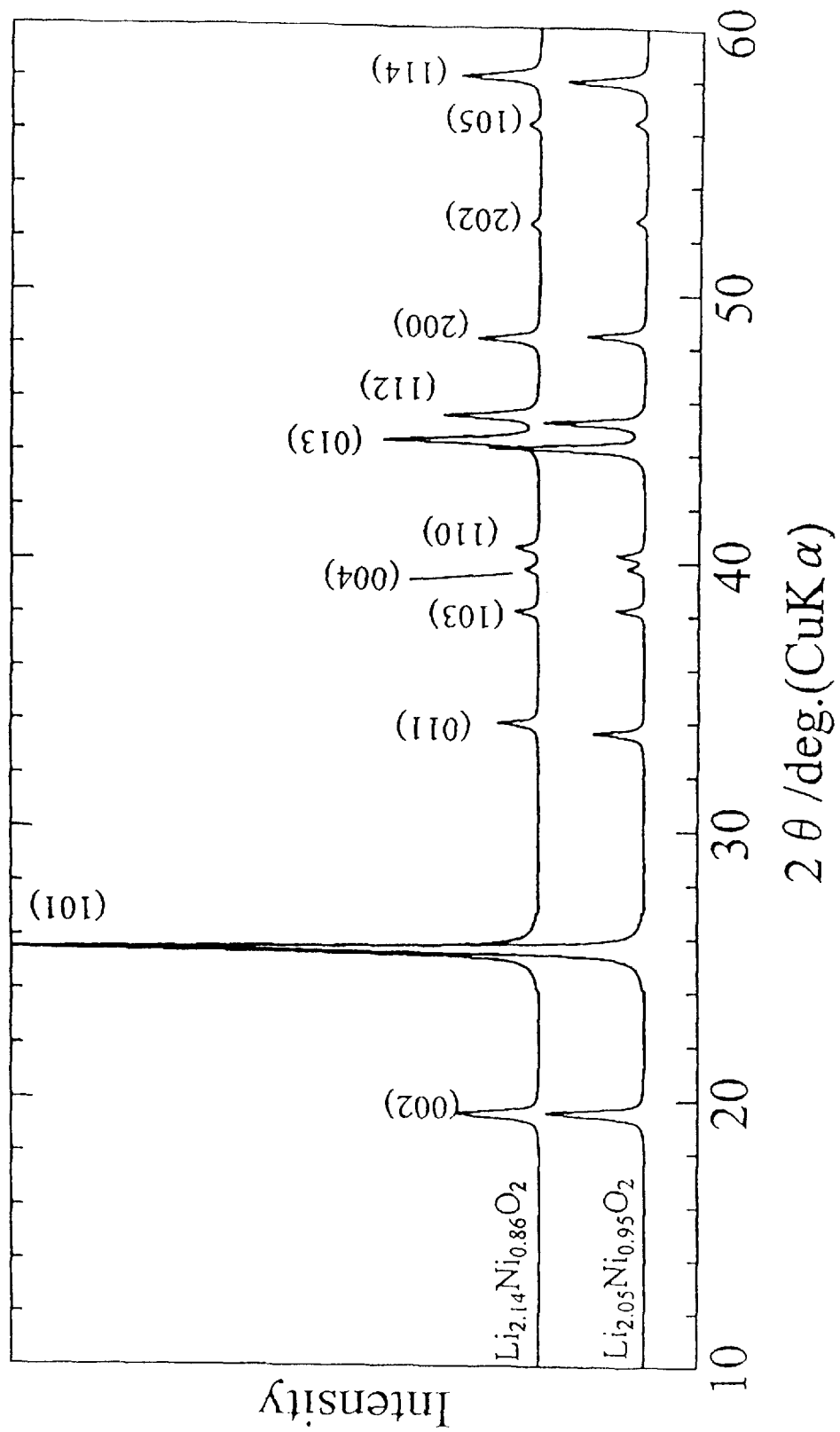
FIG. 5 is an X-ray diffraction patterns of $Li_{2.05}Ni_{0.95}O_2$ and $Li_{2.14}Ni_{0.86}O_2$ according to the present invention.

X-ray diffraction patterns of $Li_{2.05}Ni_{0.95}O_2$ and $Li_{2.14}Ni_{0.86}O_2$ are shown in FIG. 5, which were obtained by the X-ray powder diffractometry employing a Cu-targeted enclosure X-ray tube as a radiation source. A comparison between the X-ray diffraction patterns indicates that the patterns are slightly different from each other in the peak intensities at 2 θ (°)=19.6±0.5, 33.8±0.5 and that some nickel are replaced with lithium.

Synthesis of the lithium nickel composite oxides of the present invention can be used one or more nickel materials selected from the group consisting of nickel acetate, nickel amidosulfonate, diammonium nickel (II) sulfate (hexahydrate), nickel benzoate, nickel bromide, basic nickel carbonate, nickel carbonyl, nickel chloride, nickel citrate, nickel cyanide, nickel diphosphate, nickel 2-ethylhexanate, nickel fluoride, nickel formate, nickel hydroxide, nickel hypophosphite, nickel iodide, nickel lactate, nickel naphthenate, nickel nitrate, nickel oleate, nickel oxalate, nickel monoxide, dinickel trioxide, nickel perchlorate, nickel phosphate, nickel phosphinate, nickel pyrophosphate, nickel stearate, nickel sulfate, nickel sulfide, nickel tartrate and metal nickel, and one or more lithium materials selected from the group consisting of metal lithium, lithium oxide, lithium peroxide, lithium sulfide, lithium nitride, lithium fluoride, lithium chloride, lithium bromide, lithium iodide, lithium hydroxide, lithium nitrate, lithium carbonate, lithium formate, lithium acetate, lithium benzoate, lithium citrate, lithium lactate, lithium oxalate, lithium pyruvate, lithium stearate and lithium tartrate.

In the case of $Li_{2+x'}Ni_{1-x'}O_2$ (0.0<x'≦1/7), almost all nickel ions in the crystal thereof are in a state of $Ni^{2+}$ and, therefore, a nickel material containing $Ni^{2+}$ is preferably used. More preferably, nickel monoxide (NiO) is used as the nickel material. Preferably used as the lithium material is lithium oxide ($Li_2O$).

For preparation of the lithium nickel composite oxides of the present invention, the nickel material and the lithium material are mixed in an Li/Ni ratio of 2.0:1.0 to 2.5:1.0, and the resulting mixture is baked.

Particularly for synthesis of $Li_{2+x'}Ni_{1-x'}O_2$ (0.0<x'≦1/7), the Li/Ni atomic ratio may be 2.01:0.99 to 2.14:0.86.

For synthesis of $Li_2NiO_{2+y'}$ (0.0<y'<0.3), the stoichiometric Li/Ni ratio is 2.0:1.0. However, the Li/Ni ratio in starting materials is preferably 2.0:1.0 to 2.5:1.0 as the lithium material may vaporize during the calcing process. If the proportion of the lithium material is greater than the aforesaid range, the lithium material ($Li_2O$) remains in the resulting product. If the proportion of the lithium material is less than the aforesaid range, the nickel material (NiO) remains in the resulting product.

The calcing temperature is preferably 300° C. to 2,000° C. If the calcing temperature is too low, the reactivity is reduced, requiring a longer reaction period for obtaining a product that have high quality. If the calcing temperature is too high, the sublimation and vapor of the lithium material are increased and the production cost is raised. A calcing temperature of not higher than 750° C. can prevent the stabilization of NiO and, therefore, the calcing temperature is more preferably 400° C. to 750° C.

For the preparation of $Li_{2+x'}Ni_{1-x'}O_2$ (0.0<x'≦1/7), the calcination can be carried out in an atmosphere of an inert gas with a purity of not lower than 99.9%. Used as the inert gas are one or more gases selected from the group consisting of nitrogen, helium, neon, argon and krypton. Even if impurities such as $H_2O$, $O_2$ and $CO_2$ are contained in the inert gas in a concentration of about 0.1%, the atmosphere is not influenced. Since it is desirable that the synthesis of $Li_{2+x'}Ni_{1-x'}O_2$ (0.0<x'≦1/7) is carried out with nickel being kept in a state of $Ni^{+2}$, the partial pressure of oxygen is preferably lower than that of atmospheric oxygen. More preferably, the volume fraction of oxygen is not higher than 0.1%.

If some of nickel in the lithium nickel composite oxide are replaced with lithium, the number of lithium to be extracted therefrom is increased. Since the nickel of a greater atomic weight are replaced with the lithium of a smaller atomic weight, the weight per unit volume is reduced so that the capacity per unit weight is increased. However, the number of nickel which serve to compensate for electric charge is reduced, so that the capacity is reduced. Further, the replacement of nickel with lithium breaks the linear chain of (Ni—Li) $O_4$ square planer coordination units which serves as an electron conduction path. Therefore, the electron conductivity is reduced, thereby deteriorating the overall performance of the positive-electrode for a lithium secondary battery. If x'>1/7, the lithium material may remain in the resulting product. Therefore, the limit for the replacement is virtually x'=1/7. If x'<0, the nickel material may remain in a certain form in the resulting product. Even with x'<0 or x'>1/7, $Li_{2+x'}Ni_{1-x'}O_2$ may be synthesized, but the resulting product is not suitable for an electrode material because the lithium or nickel material remains in a certain form.

For the preparation of $Li_2NiO_{2+y'}$ (0.0<y'<0.3), the calcinationg can be carried out in an atmosphere of a gas mixture containing an inert gas and oxygen. Used as the inert gas are one or more gases selected from the group consisting of nitrogen, helium, neon, argon and krypton. Even if impurities such as $H_2O$ and $CO_2$ are contained in the inert gas in a concentration of about 0.1%, the calcinationg atmosphere is not influenced. The volume fraction of oxygen is preferably 0.1% to 5%. If the volume fraction of oxygen is greater than this range, $LiNiO_2$ of rock-salt super-structure or a compound having a crystalline structure similar thereto may be synthesized instead of $Li_2NiO_{2+y'}$ (0.0<y'<0.3). Since a high calcing temperature increases the oxidizing power of oxygen, the volume fraction of oxygen should be reduced.

Another process for preparing the lithium nickel composite oxide $Li_2NiO_{2+y'}$ (0.0<y'<0.3) of the present invention comprises the steps of: mixing one or more nickel materials selected from the group consisting of nickel acetate, nickel amidosulfonate, diammonium nickel (II) sulfate (hexahydrate), nickel benzoate, nickel bromide, basic nickel carbonate, nickel carbonyl, nickel chloride, nickel citrate, nickel cyanide, nickel diphosphate, nickel 2-ethylhexanate, nickel fluoride, nickel formate, nickel hydroxide, nickel hypophosphite, nickel iodide, nickel lactate, nickel naphthenate, nickel nitrate, nickel oleate, nickel oxalate, nickel monoxide, dinickel trioxide, nickel perchlorate, nickel phosphate, nickel phosphinate, nickel pyrophosphate, nickel stearate, nickel sulfate, nickel sulfide, nickel tartrate and metal nickel with one or more lithium materials selected from the group consisting of metal lithium, lithium oxide, lithium peroxide, lithium sulfide, lithium nitride, lithium fluoride, lithium chloride, lithium bromide, lithium iodide, lithium hydroxide, lithium nitrate, lithium carbonate, lithium formate, lithium acetate, lithium benzoate, lithium citrate, lithium lactate, lithium oxalate, lithium pyruvate, lithium stearate and lithium tartrate in a Li/Ni atomic ratio of 2.0:1.0 to 2.5:1.0; the resulting mixture at a temperature of 300° C. to 2,000° C. in an atmosphere of one or more gases selected from the group consisting of nitrogen, helium, neon, argon and krypton; and calcing the resulting product at a temperature of 100° C. to 2,000° C. in an atmosphere of air or in an atmosphere of one or more inert gases selected from the group consisting of nitrogen, helium, neon, argon and krypton with an oxygen volume fraction of 0.1% to 20.0%. If the calcing temperature in the latter step is too high, $LiNiO_2$ is produced and, therefore, a preferable range of the calcing temperature is 100° C. to 750° C. The oxygen volume fraction should be properly controlled depending on a value y' in $Li_2NiO_{2+y'}$ (0.0<y'<0.3) to be prepared and the calcianating temperature in the latter calcing step. More specifically, the value y' is increased with an increase in the oxygen volume fraction and with an increase in the calcing temperature. If the calcing temperature is low, the synthesis may be carried out in the air. In this preparation process, $Li_2NiO_{2+y'}$ (0.0<y'<0.3) is first synthesized in an atmosphere free from oxygen, and then oxidized. The process requires an additional step in comparison with the aforesaid preparation process in which the synthesis is carried out in an atmosphere of a gas mixture containing an inert gas and oxygen, but permits the oxidation in the air. Accordingly, the synthesis of the lithium nickel composite oxide $Li_2NiO_{2+y'}$ having a desired value y' (0.0<y'<0.3) can be carried out in the air by properly controlling the calcing temperature without precise control of the oxygen volume fraction. Therefore, the preparation process has a great industrial significance.

The range of the value y' in $Li_2NiO_{2+y'}$ synthesized by either of the preparation processes is 0.0<y'<0.3. Even if an attempt is made to synthesize $Li_2NiO_{2+y'}$ having a value y' greater than the aforesaid range, $LiNiO_2$ of rock-salt structure is produced.

For preparation of a positive-electrode for a lithium secondary battery, the lithium nickel composite oxide of the present invention is powdered to be used as a positive-electrode active material, and mixed with a conductive material, a binder and, as required, a solid electrolyte. Examples of the conductive material include carbon materials such as acetylene black and graphite powder, powdery metals and conductive ceramics, but not limited thereto. Examples of the binder include fluoropolymers such as polytetrafluoroethylene and polyvinylidene fluoride, and polyolefin polymers such as polyethylene and polypropylene, but not limited thereto. The mixing ratio is typically 1 part to 50 parts by weight of the conductive material and 1 part to 50 parts by weight of the binder with respect to 100 parts by weight of the lithium nickel composite oxide. If the proportion of the conductive material is less than 1 part by weight, the electrical resistance or polarization of the resulting electrode is increased to reduce the electrode capacity, making it impossible to fabricate a practical lithium secondary battery. If the proportion of the conductive material is greater than 50 parts by weight, the absolute amount of the lithium nickel composite oxide contained in the electrode is reduced, resulting in a reduced electrode capacity. If the proportion of the binder is less than 1 part by weight, the binding ability of the binder is lost so that the intended electrode cannot be prepared. If the proportion of the binder is greater than 50 parts by weight, the electrode capacity is reduced to an impractical level, because the electrical resistance or polarization of the resulting electrode is increased and the absolute amount of the lithium nickel composite oxide contained in the electrode is reduced. The positive-electrode is prepared by compacting the mixture in a collector or by dispersing the mixture in a solvent such as N-methyl-2-pyrrolidone to afford a slurry, applying the slurry onto a collector and drying the slurry. Usable as the collector are conductive materials such as a metal foil, a metal mesh and a metal nonwoven fabric, but the material and form of the collector are not limited thereto.

Exemplary negative-electrode materials to be used for the nonaqueous secondary battery of the present invention include metal lithium, lithium alloys such as lithium aluminum alloy, lithium-ion insertable and releasable material including conductive polymers such as polyacetylene, polythiophene and polyparaphenylene, pyrolyzed carbon materials, carbon materials pyrolyzed in a gas phase in the presence of a catalyst, carbon materials resulting form calcination of pitch, coke, tar and the like, carbon materials resulting from the calcination of polymers such as cellulose and phenolic resins, graphite materials such as natural graphite, artificial graphite and expansive graphite, and lithium-ion insertable and releasable compounds such as $WO_2$ and $MoO_2$. These materials may be used either alone or as a composite thereof. Among these negative-electrode materials, the pyrolyzed carbon materials, the carbon materials pyrolyzed in a gas phase in the presence of a catalyst, the carbon materials resulting from the calcination of pitch, coke, tar and the like, the carbon materials resulting from the calcination of polymers such as cellulose and phenolic resins, and graphite materials such as natural graphite, artificial graphite and expansive graphite are preferred.

The negative-electrode is prepared by compacting the negative-electrode material in a collector or by dispersing the negative-electrode material in a solvent such as N-methyl-2-pyrrolidone to afford a slurry, applying the slurry onto a collector and drying the slurry. Usable as the collector are conductive materials such as a metal foil, a metal mesh and a metal nonwoven fabric, but the material and form of the collector are not limited thereto.

Exemplary ion conductors to be used for the nonaqueous secondary battery of the present invention are organic electrolytic solutions, polymer solid electrolytes, molten salts and the like, among which the organic electrolytic solutions are preferred. The organic electrolytic solution comprises an organic solventant and an electrolyte.

Examples of specific organic solvents include esters such as propylene carbonate, ethylene carbonate, butylene carbonate, diethyl carbonate, dimethyl carbonate, methylethyl carbonate, γ-butyrolactone, methyl formate and methyl acetate, tetrahydrofuran and substituted hydrofurans such as 2-methyltetrahydrofuran, ethers such as dioxolane, diethyl ether, dimethoxyethane, diethoxyethane and methoxyethoxyethane, dimethylsulfoxide, sulfolane, methylsulfolane and acetonitrile. These organic solvents may be used either alone or in combination.

Examples of specific electrolytes include lithium salts such as lithium perchlorate, lithium borofluoride, lithium hexafluorophosphate, arsenic lithium hexafluoride, lithium trifluoromethane sulfonate, lithium halides and lithium chloroaluminate. At lease one selected from these electrolytes may be used.

The organic solvent and the electrolyte are not limited to those described above. The electrolytic solution is preferably dehydrated by using activated aluminum, metal lithium or the like. The moisture content of the electrolytic solution is preferably not greater than 1,000 ppm, more preferably 100 ppm. Instead of performing the dehydration process, an electrolyte and/or a solvent preliminarily dehydrated may be used.

The nonaqueous secondary battery of the present invention is fabricated by respectively bonding the positive-electrode/collector and the negative-electrode/collector to external electrodes and providing the ion conductor between the positive-and negative-electrodes. As required, a separator such as made of porous polyethylene or porous polypropylene may be provided between the positive-and negative-electrodes when the ion conductor is provided. The material and form of the separator are not limited to those described above. Further, it is preferred to provide a packing or hermetic seal such as of polypropylene or polyethylene around the external electrodes respectively connected to the positive-and negative-electrodes to prevent the external electrodes from contacting each other. The aforesaid battery fabrication process is preferably carried out in an atmosphere of an inert gas such as argon or in an atmosphere of extremely dry air to prevent moisture invasion.

The form of the nonaqueous secondary battery of the present invention is not particularly limited, but may be of a cylindrical form, a button form, a square form, a sheet form or the like.

As described above, the present invention provides novel lithium nickel composite oxides represented by the following composition formulae:

$Li_{2+x'}Ni_{1-x'}O_2$ (0.0<x'≦1/7)

$Li_2NiO_{2+y'}$ (0.0<y'<0.3)

In one process for preparing a lithium nickel composite oxide according the present invention, the lithium nickel composite oxide $Li_{2+x'}Ni_{1-x'}O_2$ (0.0<x'≦1/7) or $Li_2NiO_{2+y'}$ (0.0<y'<0.3) of the present invention can be readily prepared by mixing one or more nickel materials selected from the group consisting of nickel acetate, nickel amidosulfonate, diammonium nickel (II) sulfate (hexahydrate), nickel benzoate, nickel bromide, basic nickel carbonate, nickel carbonyl, nickel chloride, nickel citrate, nickel cyanide, nickel diphosphate, nickel 2-ethylhexanate, nickel fluoride, nickel formate, nickel hydroxide, nickel hypophosphite, nickel iodide, nickel lactate, nickel naphthenate, nickel nitrate, nickel oleate, nickel oxalate, nickel monoxide, dinickel trioxide, nickel perchlorate, nickel phosphate, nickel phosphinate, nickel pyrophosphate, nickel stearate, nickel sulfate, nickel sulfide, nickel tartrate and metal nickel with one or more lithium materials selected from the group consisting of metal lithium, lithium oxide, lithium peroxide, lithium sulfide, lithium nitride, lithium fluoride, lithium chloride, lithium bromide, lithium iodide, lithium hydroxide, lithium nitrate, lithium carbonate, lithium formate, lithium acetate, lithium benzoate, lithium citrate, lithium lactate, lithium oxalate, lithium pyruvate, lithium stearate and lithium tartrate in a Li/Ni atomic ratio of 2.0:1.0 to 2.5:1.0; and then calcing the resulting mixture in a stream of an inert gas or a gas mixture containing oxygen and an inert gas.

In another process for preparing a lithium nickel composite oxide according the present invention, the lithium nickel composite oxide $Li_2NiO_{2+y'}$ (0.0<y'<0.3) of the present invention can be readily prepared by mixing one or more lithium materials selected from the group consisting of metal lithium, lithium oxide, lithium peroxide, lithium sulfide, lithium nitride, lithium fluoride, lithium chloride, lithium bromide, lithium iodide, lithium hydroxide, lithium nitrate, lithium carbonate, lithium formate, lithium acetate, lithium benzoate, lithium citrate, lithium lactate, lithium oxalate, lithium pyruvate, lithium stearate and lithium tartrate with one or more nickel materials selected from the group consisting of nickel acetate, nickel amidosulfonate, diammonium nickel (II) sulfate (hexahydrate), nickel benzoate, nickel bromide, basic nickel carbonate, nickel carbonyl, nickel chloride, nickel citrate, nickel cyanide, nickel diphosphate, nickel 2-ethylhexanate, nickel fluoride, nickel formate, nickel hydroxide, nickel hypophosphite, nickel iodide, nickel lactate, nickel naphthenate, nickel nitrate, nickel oleate, nickel oxalate, nickel monoxide, dinickel trioxide, nickel perchlorate, nickel phosphate, nickel phosphinate, nickel pyrophosphate, nickel stearate, nickel sulfate, nickel sulfide, nickel tartrate and metal nickel in a lithium/nickel atomic ratio of 2.0:1.0 to 2.5:1.0; calcing the resulting mixture in an atmosphere of one or more inert gases selected from nitrogen, helium, neon, argon and krypton; and oxidizing the resulting product in an atmosphere of a gas mixture containing an inert gas and oxygen.

The lithium nickel composite oxides of the present invention each have two or more lithium per nickel. Therefore, even if one lithium is released, at least one lithium per molecule remains to maintain the crystalline structure. That is, if $Li_{2+x'}Ni_{1-x'}O_2$ (0.0<x'≦1/7) turns into $Li_{1+x'}Ni_{1-x'}O_2$ or $Li_2NiO_{2+y'}$ (0.0<y'<0.3) turns into $LiNiO_{2+y'}$, only about 50% of all the lithium are released. Therefore, the change in the lattice volume of the lithium nickel composite oxide resulting from the release of lithium is much smaller than in the case of $LiCoO_2$ and the like. Thus, a positive-electrode active material excellent in the cycle characteristics can be provided.

The lithium nickel composite oxides of the present invention can provide for a positive-electrode active material exhibiting a high capacity, i.e., about 245 mAh/g by the release of one lithium per molecule, and about 490 mAh/g by the release of two lithium per molecule.

Since the lithium nickel composite oxides of the present invention are each prepared by using a less expensive Ni material, the material cost can be reduced in comparison with the use of a Co material. Therefore, the lithium nickel composite oxides of the present invention provide for a positive-electrode active material and a nonaqueous secondary battery which have great industrial significance.

EXAMPLES

The present invention will hereinafter be described by way of examples thereof. It should be noted, however, that the invention is not limited by the examples.

Example 1

Positive-electrode active materials were synthesized in the following manner.

Figure 6:
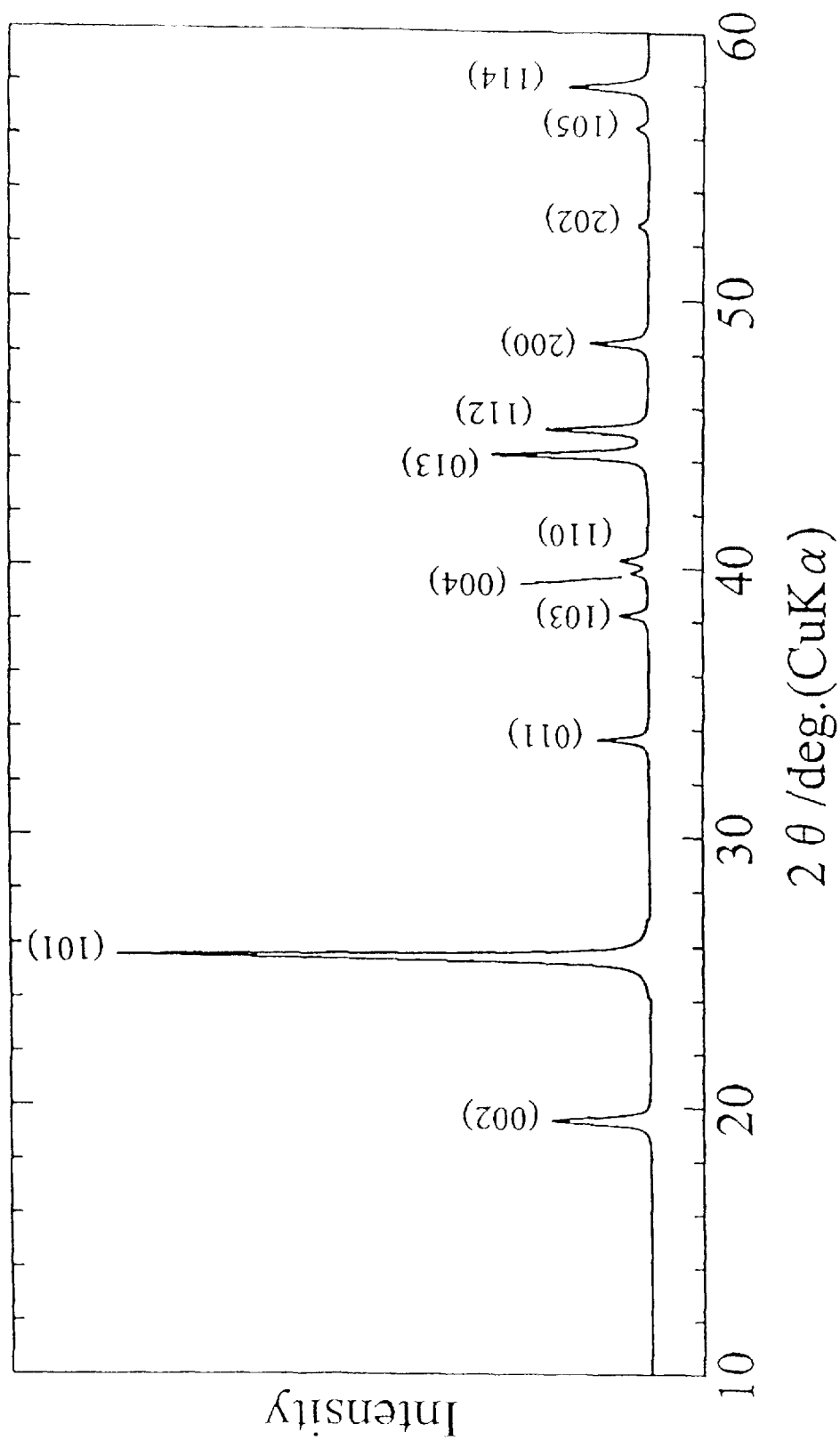
FIG. 6 is an X-ray diffraction pattern of $Li_{2.05}Ni_{0.95}O_2$ (A1a) according to Example 1.

NiO and $Li_2O$ were weighed in Li/Ni atomic ratios of 2.05:0.95 (x=1/20) and 2.14:0.86 (x=1/7), and mixed in mortars. The mixtures were each compression-molded into a disk-shaped pellet having a diameter of 8 mm and a thickness of 3 mm by applying a pressure of 150 kg/cm² thereto by means of a hydraulic press. The weighing, mixing and compression-molding processes were carried out in dry air at a humidity of not greater than 1%. The pellets were placed on a ceramic boat in an electric furnace, and nitrogen gas was introduced into the furnace. After air in the electric furnace was fully replaced with nitrogen gas, the temperature of the electric furnace was raised from the room temperature to 750° C., which was kept for 12 hours. Nitrogen gas was supplied at a flow rate of 2 l/min during the temperature raising and maintaining period. After a lapse of a predetermined period, the temperature of the electric furnace was lowered. When the temperature was lowered to around the room temperature, the resulting products were taken out. The products thus obtained were dark green powdery products A1a and A1b, which were derived from the starting material mixture shaving Li/Ni atomic ratios of 2.05:0.95 (x=1/20) and 2.14:0.86 (x=1/7), respectively. The X-ray diffraction pattern of the powdery product A1a is shown in FIG. 6. The X-ray diffractometry was performed by using CuK α rays generated by a Cu-targeted enclosure X-ray tube with an output of 2 kW. The X-ray diffraction patterns of the products A1a and A1b each had peaks at 2 θ (°)=19.6±0.5, 25.6±0.5, 44.3±0.5, 45.3±0.5, 48.5±0.5 and 58.0±0.5 with peak intensities of 20 to 35, 100, 28 to 35, 18 to 22, 10 to 14 and 17 to 20, respectively. It is noted that the peak intensities were normalized with the maximum peak intensity at 2 θ (°)=25.6±0.5 being regarded as 100. It was confirmed by the indexing of these X-ray diffraction patterns that the products A1a and A1b belonged to the Space Group Immm. As a result of a nickel valence analysis by the iodometry method and an element analysis by the ICP method, it was confirmed that the products A1a and A1b were $Li_{2.05}Ni_{0.95}O_2$ and $Li_{2.14}Ni_{0.86}O_2$, respectively.

Example 2

Figure 7:
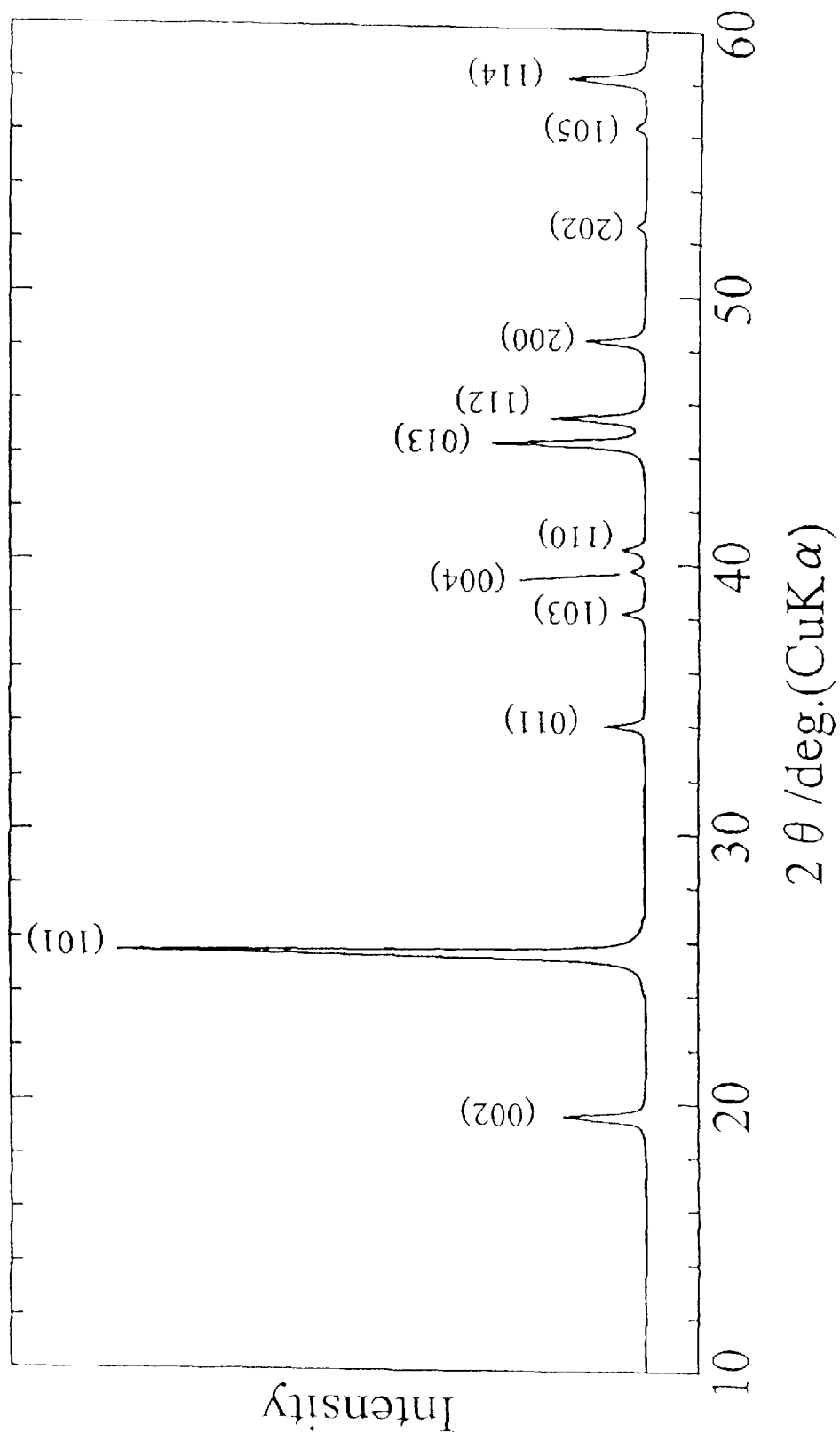
FIG. 7 is an X-ray diffraction pattern of $Li_{2.14}Ni_{0.86}O_2$ (A2b) according to Example 2.

The preparation process was carried out in substantially the same manner as in Example 1 except that the calcing temperature was 400° C. Thus, dark green powdery products A2a and A2b were obtained, which were derived from the starting material mixtures having Li/Ni atomic ratios of 2.05:0.95 (x=1/20) and 2.14:0.86 (x=1/7), respectively. The X-ray diffraction pattern of the powdery product A2a is shown in FIG. 7. The X-ray diffractometry was performed under the same conditions as in Example 1. It was confirmed by the indexing of the X-ray diffraction patterns of the products A2a and A2b that the products A2a and A2b belonged to the Space Group Immm. As a result of a nickel valence analysis by the iodometry method and an element analysis by the ICP method, it was confirmed that the products A2a and A2b were $Li_{2.05}Ni_{0.95}O_2$ and $Li_{2.14}Ni_{0.86}O_2$, respectively.

Example 3

The preparation process was carried out in substantially the same manner as in Example 1 except that argon gas was employed for the calcing atmosphere. Thus, dark green powdery products A3a and A3b were obtained, which were derived from the starting material mixtures having Li/Ni atomic ratios of 2.05:0.95 (x=1/20) and 2.14:0.86 (x=1/7), respectively. The X-ray diffractometry was performed under the same conditions as in Example 1. It was confirmed by the indexing of the X-ray diffraction patterns of the products A3a and A3b that the products A3a and A3b belonged to the Space Group Immm. As a result of a nickel valence analysis by the iodometry method and an element analysis by the ICP method, it was confirmed that the products A3a and A3b were $Li_{2.05}Ni_{0.95}O_2$ and $Li_{2.14}Ni_{0.86}O_2$, respectively.

Example 4

The preparation process was carried out in substantially the same manner as in Example 1 except that $Ni(OH)_2$ and $Li_2O$ were used as the starting materials. Thus, dark green powdery products A4a and A4b were obtained, which were derived from the starting material mixtures having Li/Ni atomic ratios of 2.05:0.95 (x=1/20) and 2.14:0.86 (x=1/7), respectively. It was confirmed by the indexing of the X-ray diffraction patterns of the products A4a and A4b that the products A4a and A4b belonged to the Space Group Immm. As a result of a nickel valence analysis by the iodometry method and an element analysis by the ICP method, it was confirmed that the products A4a and A4b were $Li_{2.05}Ni_{0.95}O_2$ and $Li_{2.14}Ni_{0.86}O_2$, respectively.

Comparative Example 1

Figure 8:
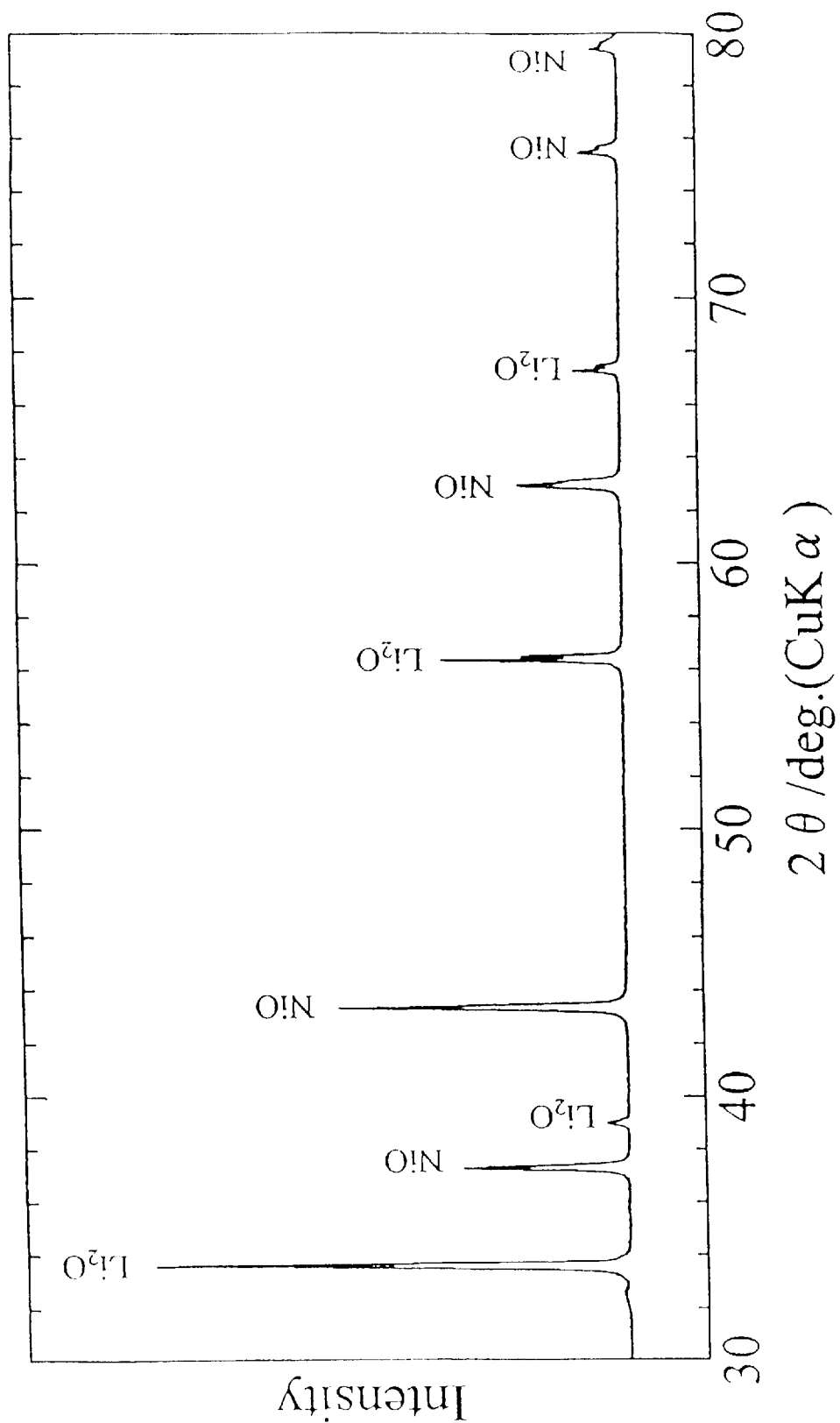
FIG. 8 is an X-ray diffraction pattern of a product B1a according to Comparative Example 1.

The preparation process was carried out in substantially the same manner as in Example 1 except that the calcing temperature was 350°. Thus, powdery products B1a and B1b were obtained, which were derived from the starting material mixtures having Li/Ni atomic ratios of 2.05:0.95 (x=1/20) and 2.14:0.86 (x=1/7), respectively. The X-ray diffraction pattern of the product B1a is shown in FIG. 8. The X-ray diffractometry was performed under the same conditions as in Example 1. The X-ray diffraction patterns of the products B1a and B1b indicated that the products B1a and B1b were mixtures of $Li_2O$ and NiO.

Comparative Example 2

The preparation process was carried out in substantially the same manner as in Example 1 except that the calcing temperature was 800° C. Thus, powdery products B2a and B2b were obtained, which were derived from the starting material mixtures having Li/Ni atomic ratios of 2.05:0.95 (x=1/20) and 2.14:0.86 (x=1/7), respectively. The X-ray diffractometry was performed under the same conditions as in Example 1. The X-ray diffraction patterns of the products B2a and B2b indicated that the products B2a and B2b were mixtures of $Li_2O$ and NiO.

Comparative Example 3

Figure 9:
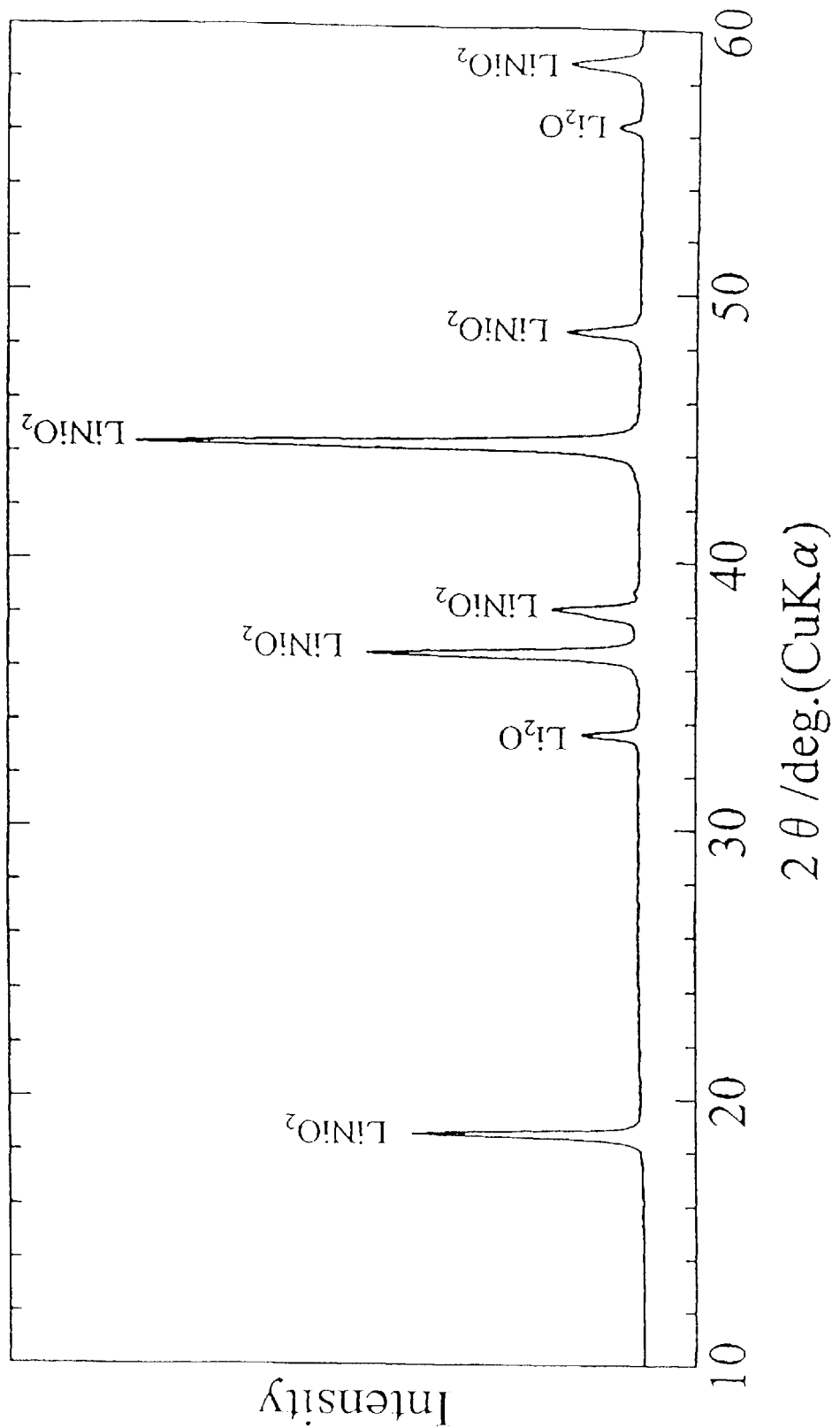
FIG. 9 is an X-ray diffraction pattern of a product B3a according to Comparative Example 3.

The preparation process was carried out in substantially the same manner as in Example 1 except that oxygen gas was employed for the calcing atmosphere. Thus, powdery products B3a and B3b were obtained, which were derived from the starting material mixtures having Li/Ni atomic ratios of 2.05:0.95 (x=1/20) and 2.14:0.86 (x=1/7), respectively. The X-ray diffraction pattern of the product B3a is shown in FIG. 9. The X-ray diffractometry was performed under the same conditions as in Example 1. The X-ray diffraction patterns of the products B3a and B3b indicated that the products B3a and B3b were each $LiNiO_2$ of rock-salt structure.

Comparative Example 4

Figure 10:
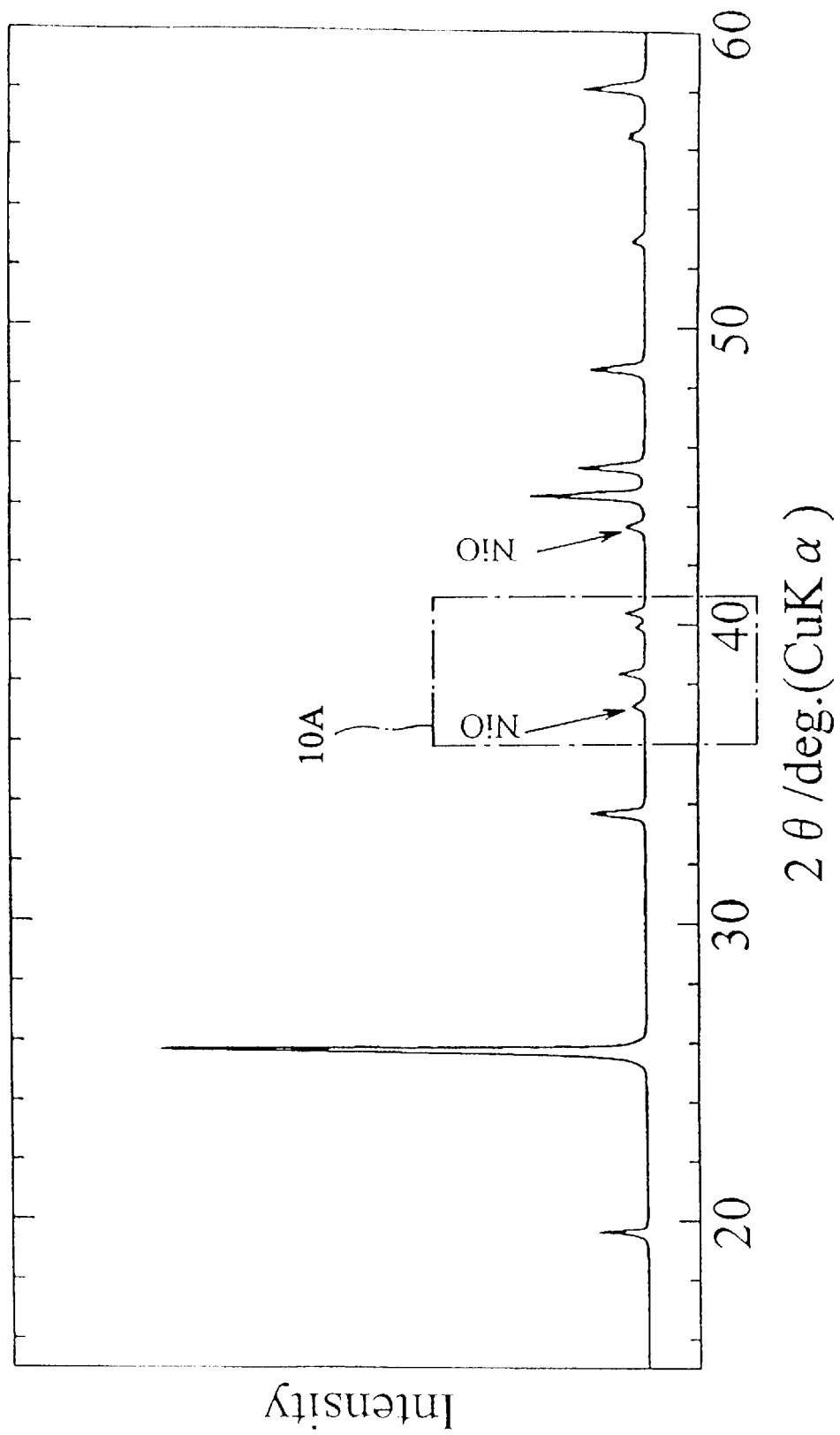
FIG. 10 is an X-ray diffraction pattern of a product B4a according to Comparative Example 4.
Figure 11A:
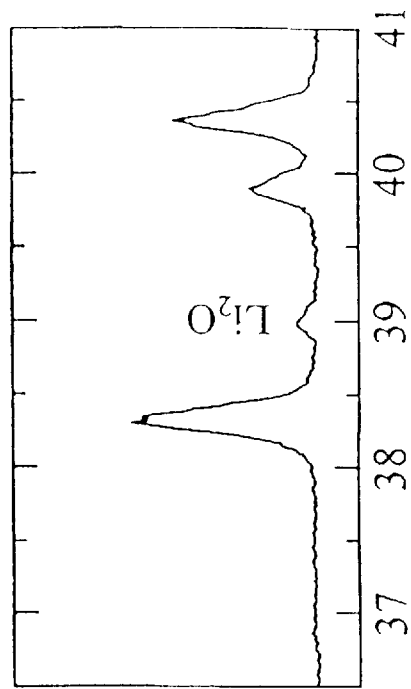
FIG. 11A is an enlargement of a portion of FIG. 11.
Figure 10A:
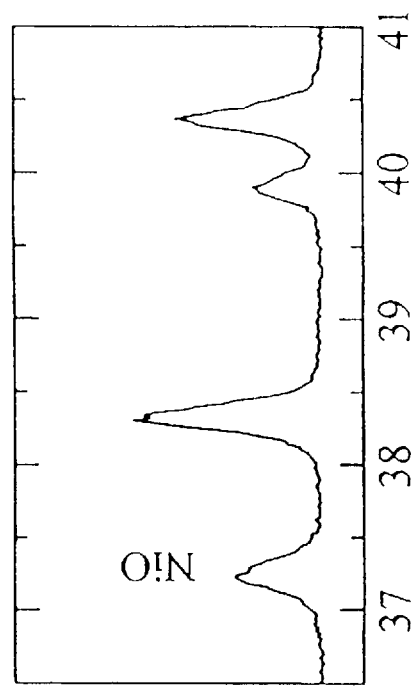
FIG. 10A is an enlargement of a portion of FIG. 10.
Figure 11:
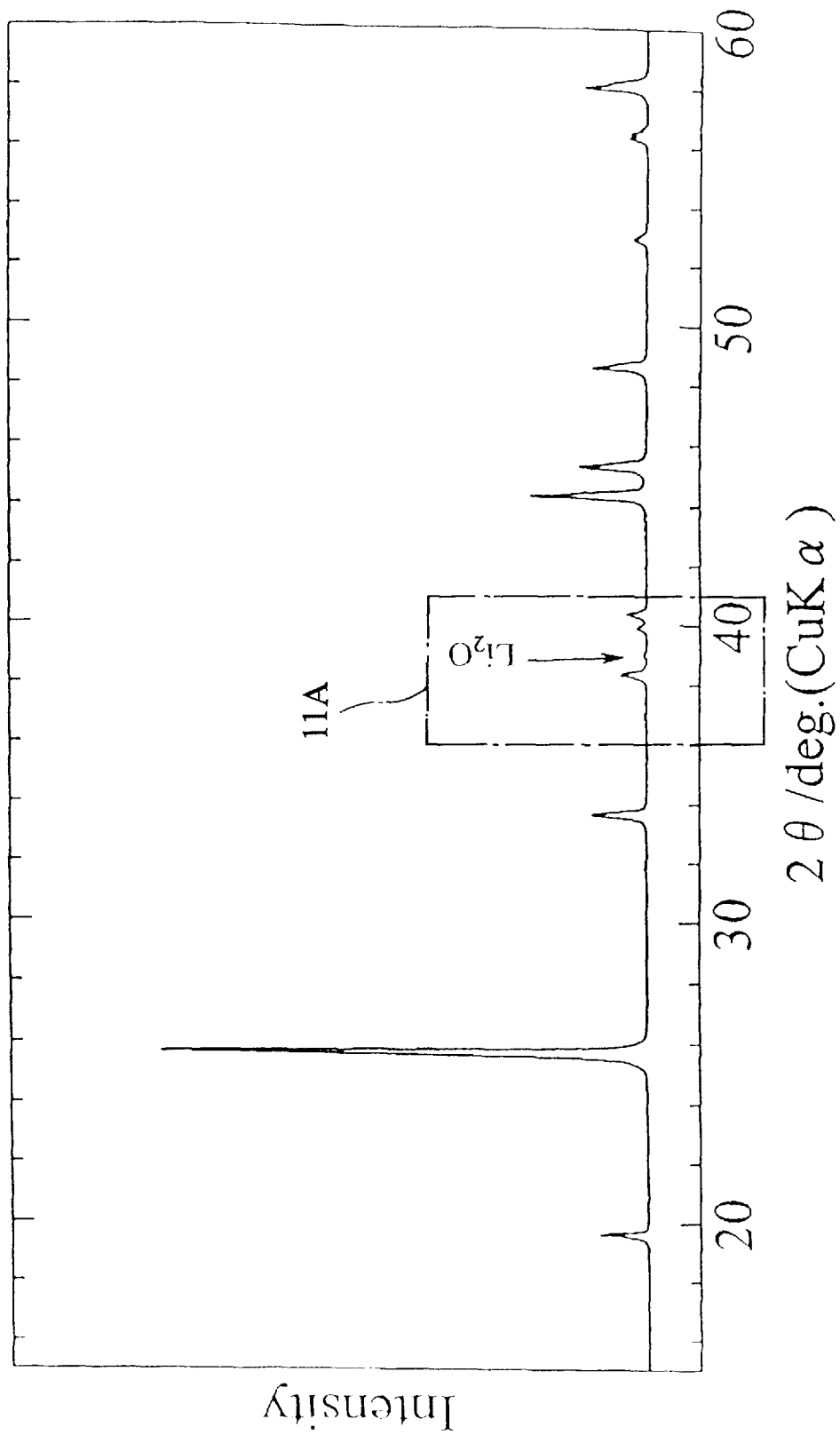
FIG. 11 is an X-ray diffraction pattern of a product B4b according to Comparative Example 4.

The preparation process was carried out in substantially the same manner as in Example 1 except that starting material mixtures respectively having Li/Ni atomic ratios of 1.95:1.05 (x=−1/20) and 2.2:0.8 (x=1/5) were used. Thus, powdery products B4a and B4b were obtained, which were derived from the starting material mixtures having Li/Ni atomic ratios of 1.95:1.05 (x=−1/20) and 2.2:0.8 (x=1/5), respectively. The X-ray diffraction patterns of the products B4a and B4b are shown in FIGS. 10 and 11, respectively. The X-ray diffractometry was performed under the same conditions as in Example 1. It was confirmed by the indexing of the X-ray diffraction patterns that the products B4a and B4b each contained a compound belonging to the Space Group Immm and a certain impurity. The X-ray diffraction patterns indicated that the products B4a and B4b were a mixture of $Li_2NiO_2$ and NiO and a mixture of $Li_2NiO_2$ and $Li_2O$, respectively.

Example 5

A positive-electrode active material was synthesized in the following manner.

Figure 12:
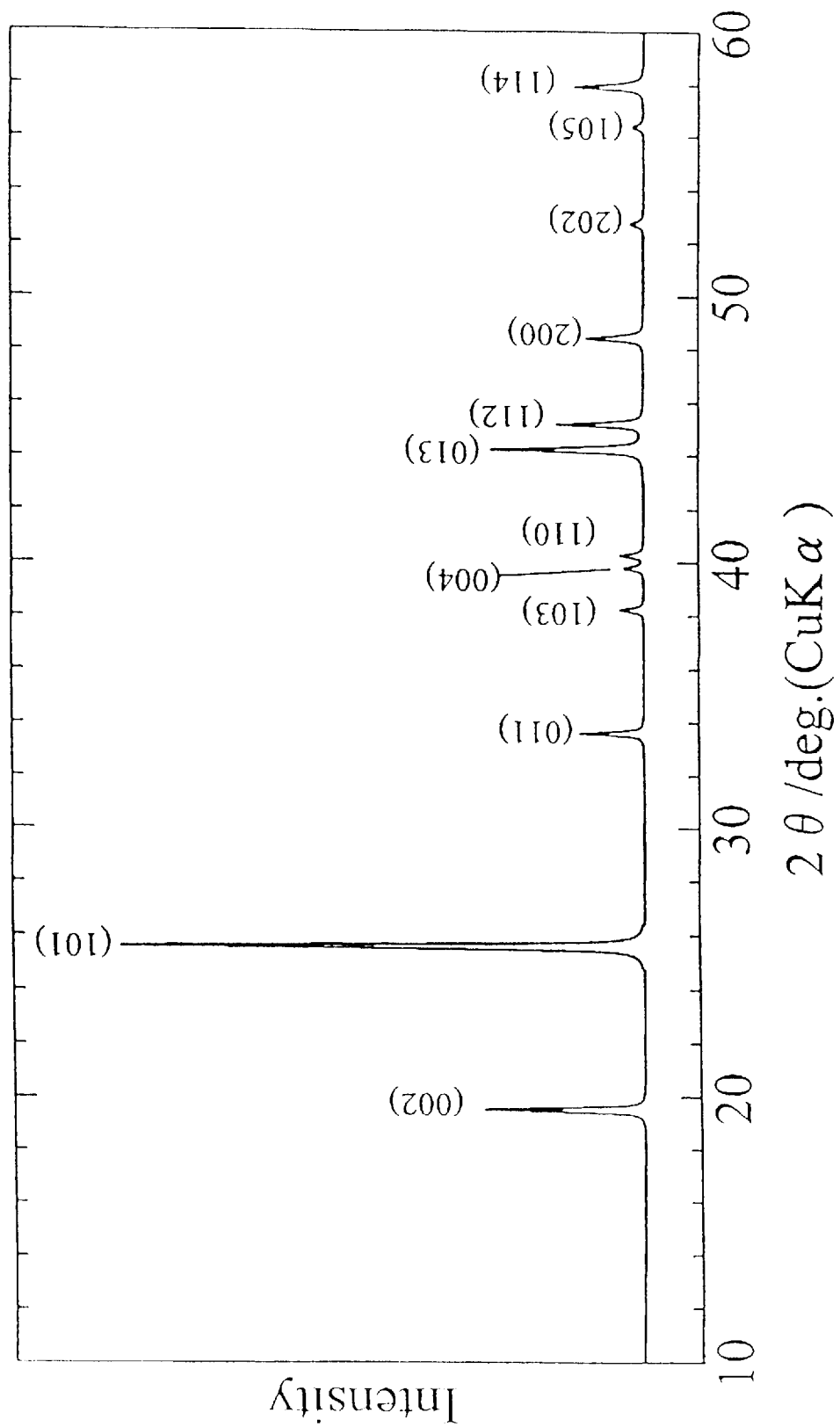
FIG. 12 is an X-ray diffraction pattern of $Li_2NiO_{2.2}$ (A5) according to Example 5.

NiO and $Li_2O$ were weighed in an Li/Ni atomic ratio of 2.0:1.0, and mixed in a mortar. The mixture was compression-molded into a disk-shaped pellet having a diameter of 8 mm and a thickness of 3 mm by applying a pressure of 150 kg/cm² thereto by means of a hydraulic press. The weighing, mixing and compression-molding processes were carried out in dry air at a humidity of not greater than 1%. The pellet was placed on a ceramic boat in an electric furnace, and a gas mixture containing 99% of nitrogen gas and 1% of oxygen gas was introduced into the furnace. After air in the electric furnace was fully replaced with the gas mixture, the temperature of the electric furnace was raised from the room temperature to 750° C., which was kept for 12 hours. The gas mixture was supplied at a flow rate of 2 l/min during the temperature raising and maintaining period. After a lapse of a predetermined period, the temperature of the electric furnace was lowered. When the temperature was lowered to around the room temperature, the resulting product was taken out. The product thus obtained was a black powdery product A5. The X-ray diffractometry was performed on the powdery product A5 by employing a Cu-targeted enclosure tube as an X-ray source with an output of 2 kW. The X-ray diffraction pattern of the powdery product A5 is shown in FIG. 12. The X-ray diffraction pattern of the product A5 had peaks at $2\theta$ (°)=19.6±0.5, 25.6±0.5, 44.3±0.5, 45.3±0.5, 48.5±0.5 and 58.0±0.5 with peak intensities of 20 to 35, 100, 28 to 35, 18 to 22, 10 to 14 and 17 to 20, respectively. It is noted that the peak intensities were normalized with the maximum peak intensity at $2\theta$ (°)=25.6±0.5 being regarded as 100. It was confirmed by the indexing of the X-ray diffraction pattern that the product A5 belonged to the Space Group Immm. As a result of a nickel valence analysis by the iodometry method and an element analysis by the ICP method, it was confirmed that the product A5 was $Li_2NiO_{2.2}$.

Example 6

Figure 13:
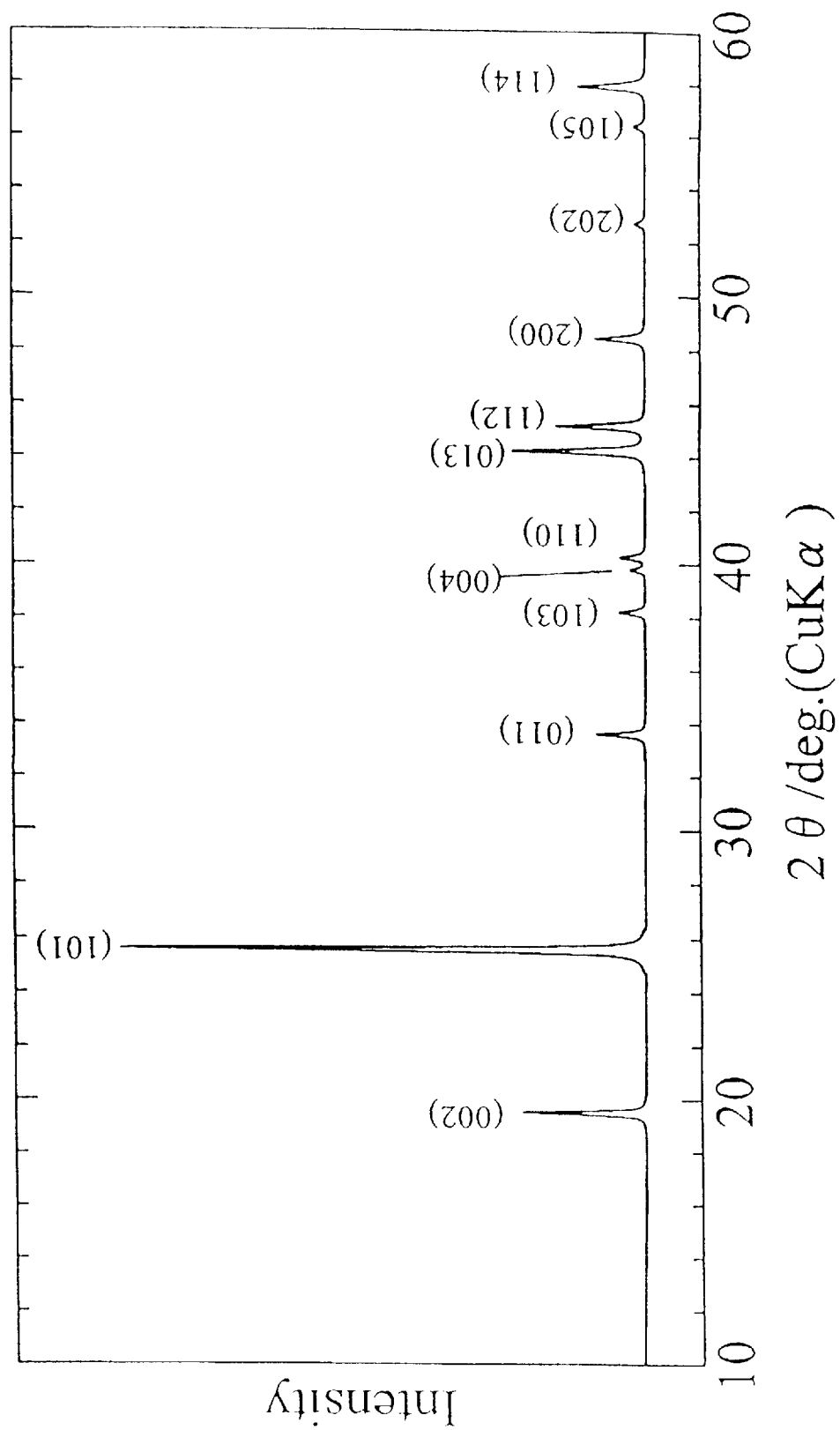
FIG. 13 is an X-ray diffraction pattern of $Li_2NiO_{2.05}$ (A6) according to Example 6.

The preparation process was carried out in substantially the same manner as in Example 5 except that the calcing temperature was 400° C. Thus, a black powdery product A6 was obtained. The X-ray diffractometry was performed under the same conditions as in Example 5. The X-ray diffraction pattern of the powdery product A6 is shown in FIG. 13. It was confirmed by the indexing of the X-ray diffraction pattern that the product A6 belonged to the Space Group Immm. As a result of a nickel valence analysis by the iodometry method and an element analysis by the ICP method, it was confirmed that the product A6 was $Li_2NiO_{2.05}$.

Example 7

The preparation process was carried out in substantially the same manner as in Example 5 except that a gas mixture containing 95% of argon gas and 5% of oxygen gas was employed for the calcing atmosphere. Thus, a black powdery product A7 was obtained. The X-ray diffractometry was performed under the same conditions as in Example 5. It was confirmed by the indexing of the X-ray diffraction pattern of the product A7 that the product A7 belonged to the Space Group Immm. As a result of a nickel valence analysis by the iodometry method and an element analysis by the ICP method, it was confirmed that the product A7 was $Li_2NiO_{2.28}$.

Example 8

The preparation process was carried out in substantially the same manner as in Example 5 except that $Ni(OH)_2$ and $LiO_2$ were employed as the starting materials. Thus, a black powdery product A8 was obtained. The X-ray diffractometry was performed under the same conditions as in Example 5. It was confirmed by the indexing of the X-ray diffraction pattern of the product A8 that the product A8 belonged to the Space Group Immm. As a result of a nickel valence analysis by the iodometry method and an element analysis by the ICP method, it was confirmed that the products A8 was $Li_2NiO_{2.2}$.

Example 9

The preparation process was carried out in substantially the same manner as in Example 5 except that the Li/Ni atomic ratio was 2.5:1.0. Thus, a black powdery product A9 was obtained. The X-ray diffractometry was performed under the same conditions as in Example 5. It was confirmed by the indexing of the X-ray diffraction pattern of the product A9 that the product A9 belonged to the Space Group Immm. As a result of a nickel valence analysis by the iodometry method and an element analysis by the ICP method, it was confirmed that the product A9 was $Li_2NiO_{2.2}$.

Comparative Example 5

Figure 14:
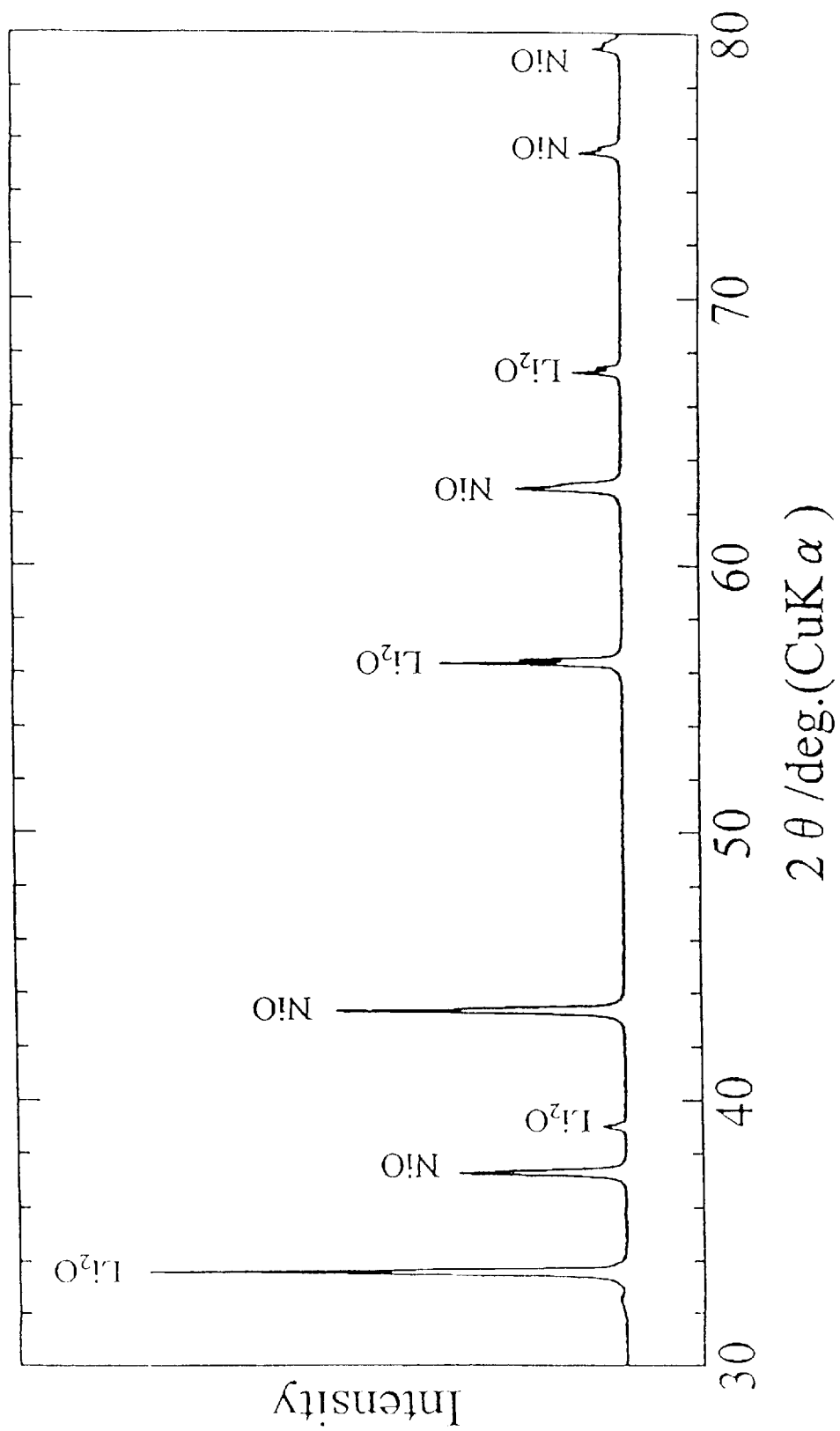
FIG. 14 is an X-ray diffraction pattern of a product B5 according to Comparative Example 5.

The preparation process was carried out in substantially the same manner as in Example 5 except that the calcing temperature was 350° C. Thus, a powdery product B5 was obtained. The X-ray diffraction pattern of the powdery product B5 is shown in FIG. 14. The X-ray diffractometry was performed under the same conditions as in Example 5. The X-ray diffraction pattern indicated that the product B5 was a mixture of the starting materials $Li_2O$ and NiO.

Comparative Example 6

The preparation process was carried out in substantially the same manner as in Example 5 except that the calcing temperature was 800° C. Thus, a product B6 was obtained. The X-ray diffractometry was performed under the same conditions as in Example 5. The X-ray diffraction pattern of the product B6 indicated that the product B6 was a mixture of NiO an $Li_2O$.

Comparative Example 7

Figure 15:
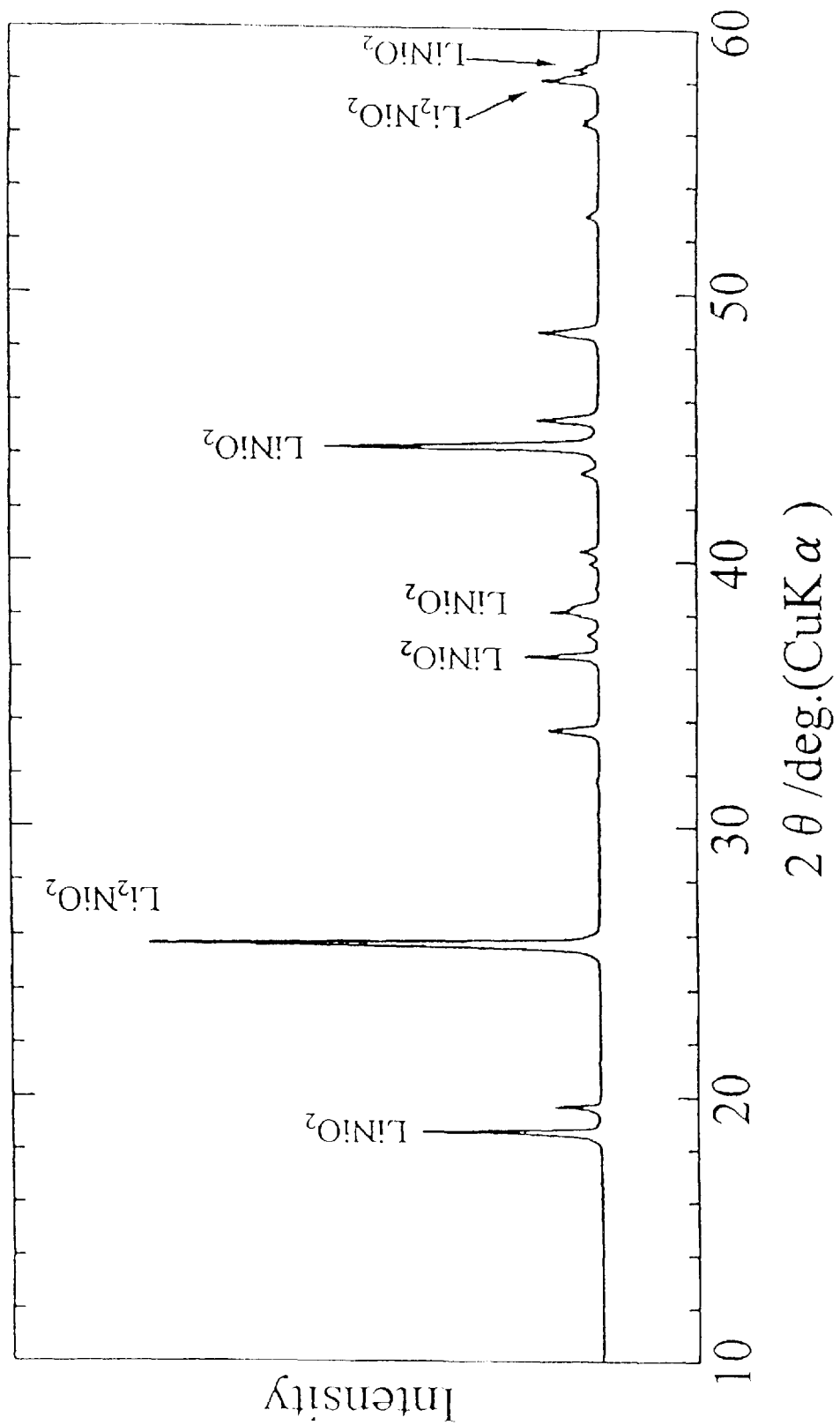
FIG. 15 is an X-ray diffraction pattern of a product B7 according to Comparative Example 7.

The preparation process was carried out in substantially the same manner as in Example 5 except that a gas mixture containing 90% of nitrogen gas and 10% of oxygen gas was employed for the calcing atmosphere. Thus, a powdery product B7 was obtained. The X-ray diffraction pattern of the powdery product B7 is shown in FIG. 15. The X-ray diffractometry was performed under the same conditions as in Example 5. The X-ray diffraction pattern indicated that the product B7 was a mixture of $LiNiO_2$ and $Li_2NiO_{2+y}$.

Comparative Example 8

Figure 16:
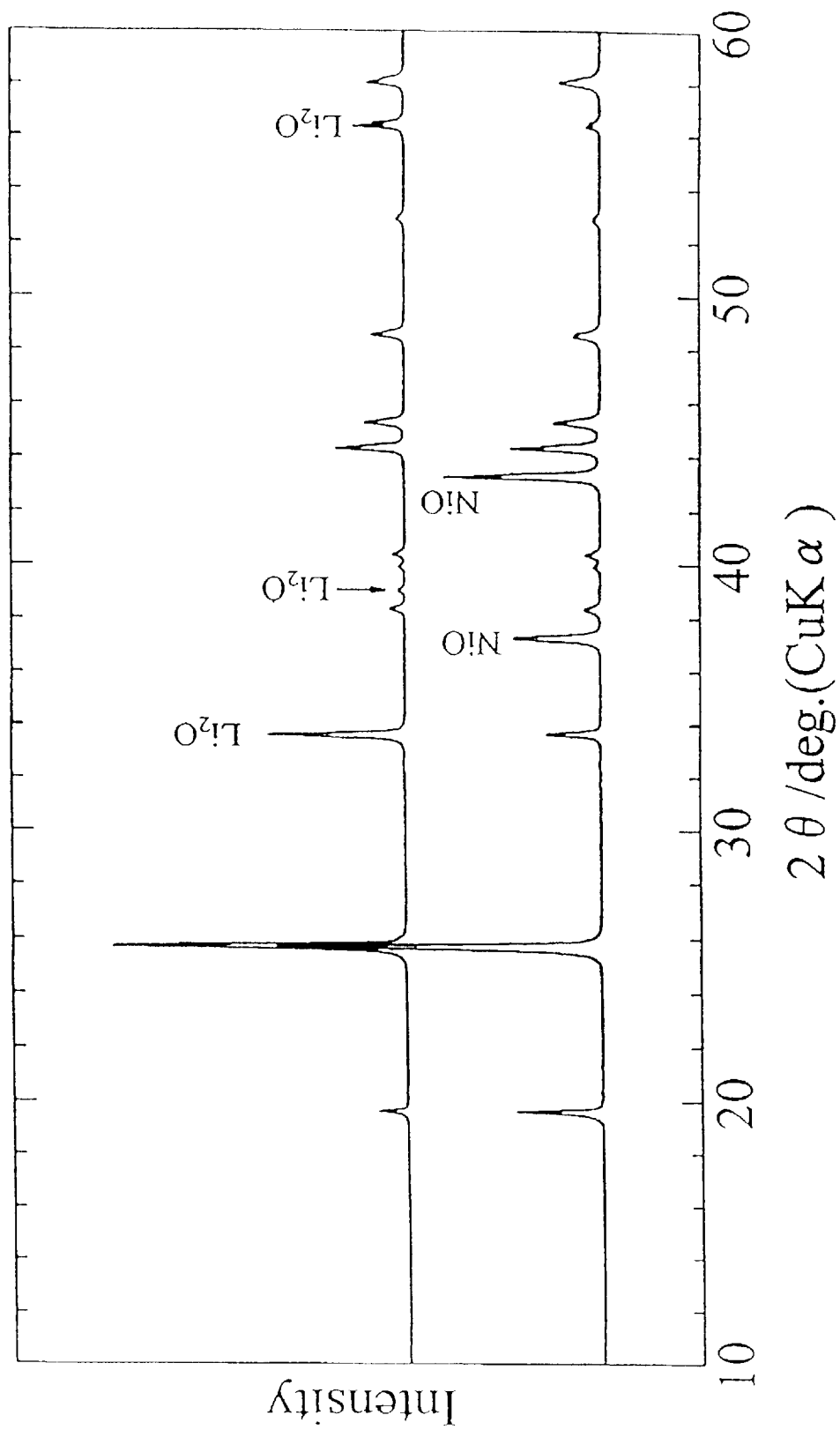
FIG. 16 is X-ray diffraction patterns of products B8a and B8b according to Comparative Example 8.

The preparation process was carried out in substantially the same manner as in Example 5 except that starting material mixtures respectively having Li/Ni atomic ratios 1.0:1.0 and 3.0:1.0 were used. Thus, powdery products B8a and B8b were obtained, which were derived from the starting material mixtures having Li/Ni atomic ratios of 1.0:1.0 and 3.0:1.0, respectively. The X-ray diffraction patterns of the powdery products B8a and B8b are shown in FIG. 16. The X-ray diffractometry was performed under the same conditions as in Example 5. The X-ray diffraction patterns indicated that the products B8a and B8b were a mixture of $Li_2NiO_{2+y}$ and NiO and a mixture of $Li_2NiO_{2+y}$ and $Li_2O$, respectively.

Comparative Example 9

The preparation process was carried out in substantially the same manner as in Example 5 except that 100% nitrogen gas was employed for the calcing atmosphere. Thus, a product B9 was obtained. The X-ray diffractometry was performed under the same conditions as in Example 5. It was confirmed by the indexing of the X-ray diffraction pattern of the product B9 that the product B9 belonged to the Space Group Immm. As a result of a nickel valence analysis by the iodometry method and an element analysis by the ICP method, it was confirmed that the product B9 was $Li_2NiO_2$ which had no excess oxygen.

Example 10

NiO and $Li_2O$ were weighed in an Li/Ni atomic ratio of 2.0:1.0, and mixed in a mortar. The mixture was compression-molded into a disk-shaped pellet having a diameter of 8 mm and a thickness of 3 mm by applying a pressure of 150 kg/cm$^2$ thereto by means of a hydraulic press. The weighing, mixing and compression-molding processes were carried out in dry air at a humidity of not greater than 1%. The pellet was placed on a ceramic boat in an electric furnace, and 99.99% nitrogen gas was introduced into the furnace. After air in the electric furnace was fully replaced with the 99.9% nitrogen gas, the temperature of the electric furnace was raised from the room temperature to 750° C., which was kept for 12 hours. The 99.9% nitrogen gas was supplied at a flow rate of 2 l/min during the temperature raising and maintaining period. After a lapse of a predetermined period, the temperature of the electric furnace was lowered to 100° C., and then a gas mixture containing 80% of nitrogen gas and 20% of oxygen gas was introduced into the furnace. With this state, the resulting intermediate product was further calcinated for oxidation thereof for 12 hours, during which the gas mixture was continuously supplied at a flow rate of 2 l/min. When the temperature of the furnace was thereafter lowered to the room temperature, a product was taken out. The product thus obtained was a black powdery product A10.

The X-ray powder diffractometry was performed under the same conditions as in Example 5. The X-ray diffraction pattern of the product A10 had peaks at 2 θ (°)=19.6±0.5, 25.6±0.5, 44.3±0.5, 45.3±0.5, 48.5±0.5 and 58.0±0.5 with peak intensities of 20 to 35, 100, 28 to 35, 18 to 22, 10 to 14 and 17 to 20, respectively. It is noted that the peak intensities were normalized with the maximum peak intensity at 2 θ (°)=25.6±0.5 being regarded as 100. It was confirmed by the indexing of the X-ray diffraction pattern that the product A10 belonged to the Space Group Immm. As a result of a nickel valence analysis by the iodometry method and an element analysis by the ICP method, it was confirmed that the product A10 was $Li_2NiO_{2.05}$.

Example 11

The preparation process was carried out in substantially the same manner as in Example 10 except that helium gas was employed for the calcing atmosphere. Thus, a product A11 was obtained. The X-ray diffractometry was performed under the same conditions as in Example 5. It was confirmed by the indexing of the X-ray diffraction pattern of the product A11 that the product A11 belonged to the Space Group Immm. As a result of a nickel valence analysis by the iodometry method and an element analysis by the ICP method, it was confirmed that the product A11 was $Li_2NiO_{2.05}$.

Example 12

The preparation process was carried out in substantially the same manner as in Example 10 except that a gas mixture containing 99% of argon gas and 1% of oxygen gas was employed for the atmosphere for the oxidation and the calcing temperature for the oxidation was 750° C. Thus, a product A12 was obtained. It was confirmed by the indexing of the X-ray diffraction pattern of the product A12 that the product A12 belonged to the Space Group Immm. As a result of a nickel valence analysis by the iodometry method and an element analysis by the ICP method, it was confirmed that the product A12 was $Li_2NiO_{2.2}$.

Example 13

The preparation process was carried out in substantially the same manner as in Example 10 except that the calcing temperature was 400°. Thus, a product A13 was obtained. The X-ray diffractometry was performed under the same conditions as in Example 5. It was confirmed by the indexing of the X-ray diffraction pattern of the product A13 that the product A13 belonged to the Space Group Immm. As a result of a nickel valence analysis by the iodometry method and an element analysis by the ICP method, it was confirmed that the product A13 was $Li_2NiO_{2.05}$.

Example 14

The preparation process was carried out in substantially the same manner as in Example 10 except that a starting material mixture having an Li/Ni atomic ratio of 2.5:1.0 was used. Thus, a product A14 was obtained. The X-ray diffractometry was performed under the same conditions as in Example 5. It was confirmed by the indexing of the X-ray diffraction pattern of the product A14 that the product A14 belonged to the Space Group Immm. As a result of a nickel valence analysis by the iodometry method and an element analysis by the ICP method, it was confirmed that the product A14 was $Li_2NiO_{2.05}$.

Comparative Example 10

The preparation process was carried out in substantially the same manner as in Example 10 except that the calcing temperature was 800° C. and starting material mixtures respectively having Li/Ni atomic ratios of 2.0:1.0 and 2.5:1.0 were used. Thus, products B10a and B10b were obtained, which were derived from the starting material mixtures having Li/Ni atomic ratios of 2.0:1.0 and 2.5:1.0, respectively. The X-ray diffractometry was performed under the same conditions as in Example 5. The X-ray diffraction patterns of the products B10a and B10b indicated that the products B10a and B10b were mixtures of NiO and $Li_2O$.

Comparative Example 11

The preparation process was carried out in substantially the same manner as in Example 10 except that the calcing temperature was 350° C. Thus, a product B11 was obtained.

The X-ray diffractometry was performed under the same conditions as in Example 5. The X-ray diffraction pattern of the product B11 indicated that the product B11 was a mixture of NiO and $Li_2O$.

Comparative Example 12

The preparation process was carried out in substantially the same manner as in Example 10 except that a gas mixture containing 75% of nitrogen gas and 25% of oxygen gas was employed for the atmosphere for the oxidation. Thus, a product B12 was obtained. The X-ray diffraction pattern of the product B12 indicated that the product B12 was a mixture of $LiNiO_2$ and $Li_2NiO_{2+y}$.

Comparative Example 13

The preparation process was carried out in substantially the same manner as in Example 12 except that the calcing temperature for the oxidation was 800° C. Thus, a product B13 was obtained. The X-ray diffractometry was performed under the same conditions as in Example 5. The diffraction pattern of the product B13 indicated that the product B13 was a mixture of $LiNiO_2$ and $Li_2NiO_{2+y}$.

Comparative Example 14

The preparation process was carried out in substantially the same manner as in Example 12 except that the calcing temperature for the oxidation was 75° C. Thus, a product B14 was obtained. The X-ray diffractometry was performed under the same conditions as in Example 5. It was confirmed by the indexing of the X-ray diffraction pattern of the product B14 that the product B14 belonged to the Space Group Immm. As a result of a nickel valence analysis by the iodometry method and an element analysis by the ICP method, it was confirmed that the product B14 was $Li_2NiO_2$ which had no excess oxygen.

Example 15

Figure 17:
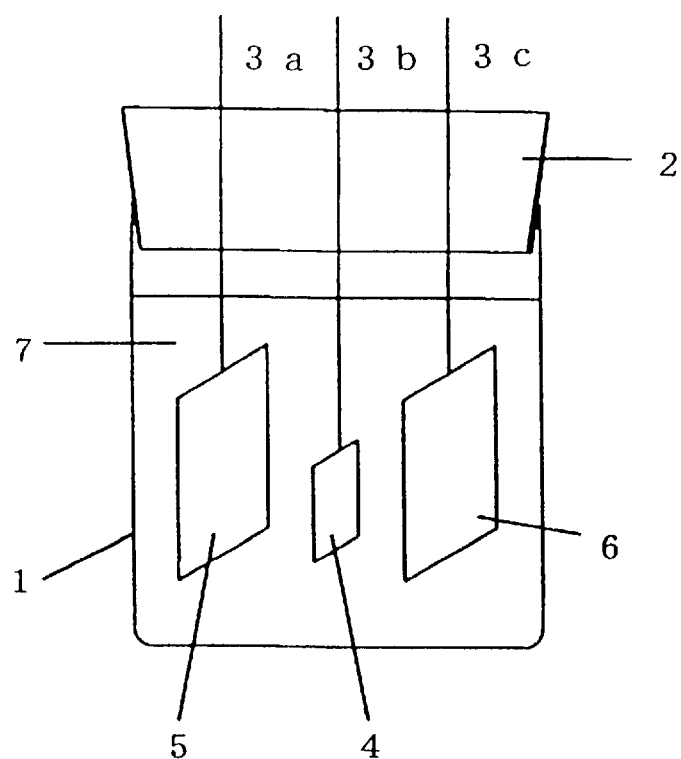
FIG. 17 is a schematic diagram illustrating the basic structure of triode batteries fabricated in Examples 15 to 18.

FIG. 17 is a schematic diagram illustrating an exemplary triode battery according to the present invention. In FIG. 17, there are shown a glass cell 1, a lid 2, leads 3a, 3b and 3c, a counter electrode 4, a positive-electrode 5, a negative-electrode 6, and an electrolyte 7.

The positive-electrode active material A1a was pulverized in a mortar, and mixed with about 10 wt % of acetylene black as a conductive material and then with about 10 wt % of a powdery Teflon resin as a binder. The resulting mixture was molded into a pellet by means of a pelleting machine, and the pellet was crimped with a metal mesh for preparation of the positive-electrode 5. Lithium sheets each crimped with an Ni mesh were used as the negative-electrode 6 and the counter electrode 4. Used as the electrolyte 7 was a solution containing 1 mol/l $LiClO_4$ dissolved in a solvent mixture of 50 vol % of ethylene carbonate and 50 vol % of diethyl carbonate. The counter electrode 4, the positive-electrode 5, the negative-electrode 6 and the electrolyte 7 were incorporated in the glass cell 1. A charge-discharge test was performed on the battery thus fabricated. The fabrication process and the test were carried out in an Ar dry box.

Figure 18:
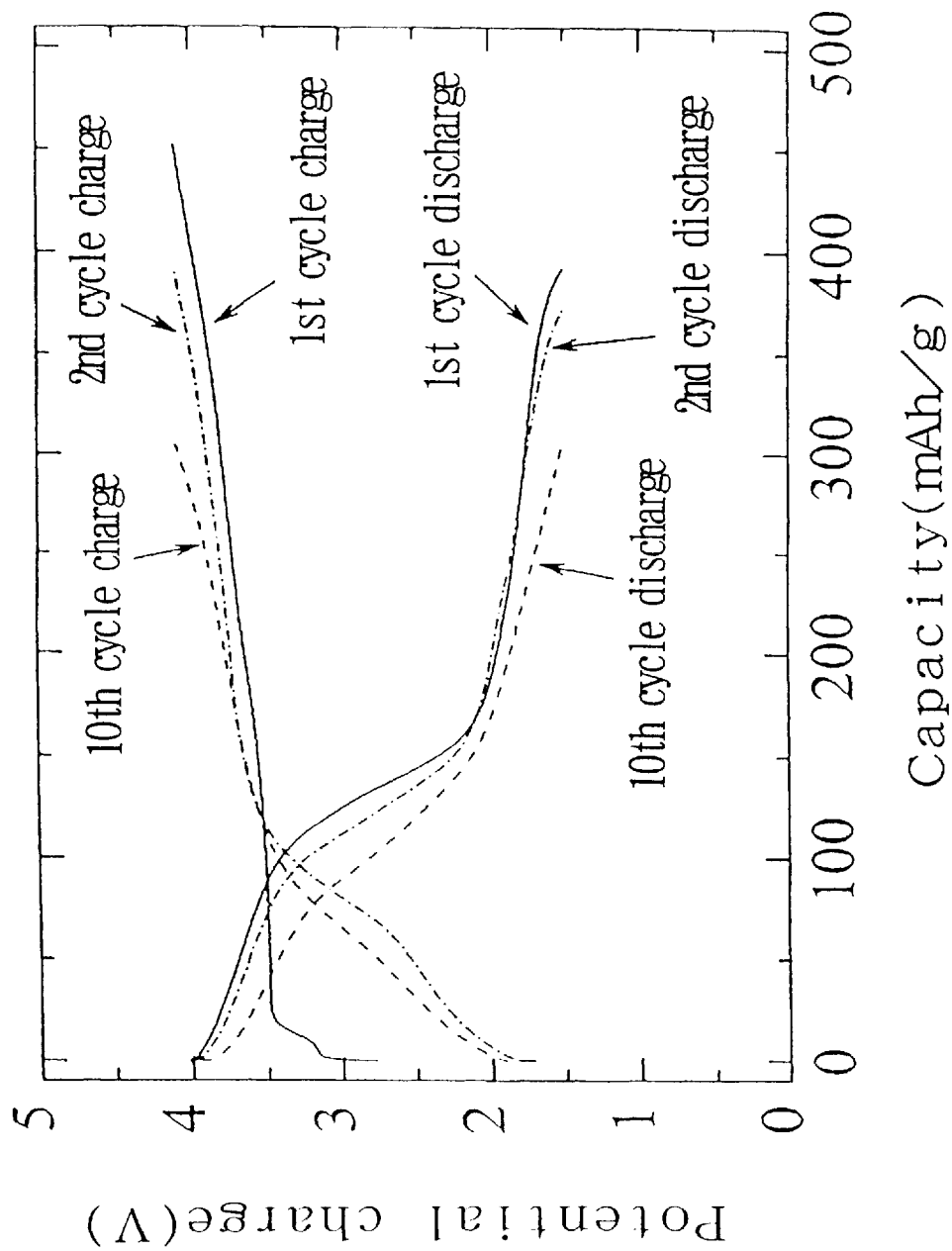
FIG. 18 is a graphical representation illustrating the potential change of the triode battery (A1a) of Example 15 observed during charge-discharge cycle.
Figure 19:
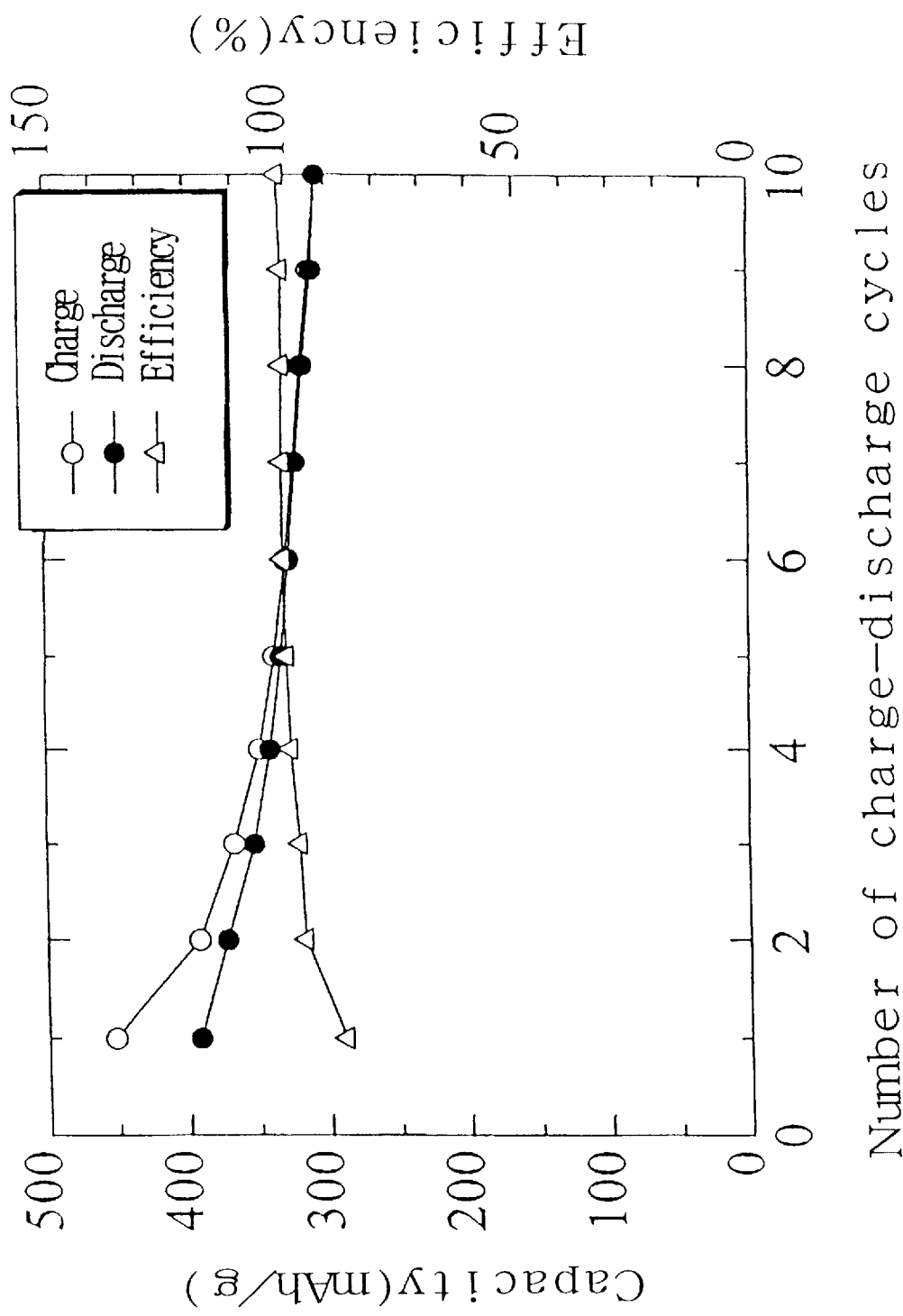
FIG. 19 is a graphical representation illustrating the capacity change of the triode battery (A1a) of Example 15 with the charge-discharge cycle.

The battery was charged and discharged within a potential range between 1.5 V and 4.2 V at a constant current. The potential change observed during the charge-discharge processes is shown in FIG. 18. The capacity change with the charge-discharge cycle is shown in FIG. 19 and Table 1. In the first charge-discharge cycle, the battery exhibited very high charge-discharge capacities, that is, a charge capacity of about 450 mAh/g and a discharge capacity of about 390 mAh/g. The first charge-discharge capacities indicated that about 1.8 lithium were deintercalated from $Li_2NiO_2$ during the charge process and about 1.6 lithium ions were inserted back during the discharge process. In addition, the charge-discharge efficiency was very high.

TABLE 1

| Cycle | Charge mAh/g | Discharge mAh/g | Efficiency % |
|---|---|---|---|
| 1 | 452.3 | 392.1 | 86.7 |
| 2 | 391.8 | 372.1 | 95.0 |
| 3 | 366.9 | 352.5 | 96.1 |
| 4 | 348.4 | 340.8 | 97.8 |
| 5 | 337.6 | 332.7 | 98.6 |
| 6 | 329.5 | 327.2 | 99.3 |
| 7 | 323.7 | 321.8 | 99.4 |
| 8 | 318.3 | 316.2 | 99.3 |
| 9 | 311.8 | 309.4 | 99.2 |
| 10 | 306.4 | 306.6 | 100.1 |

Figure 20:
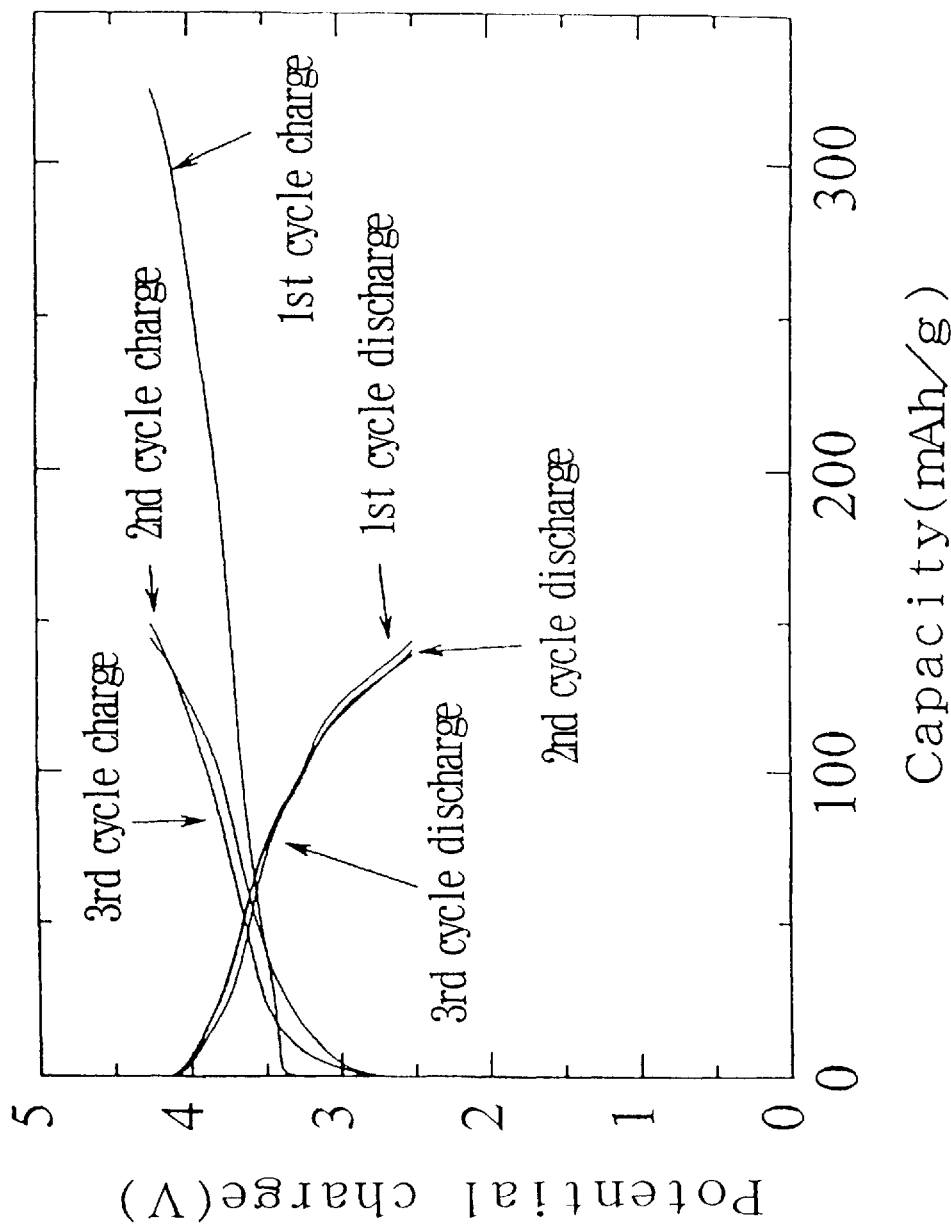
FIG. 20 is a graphical representation illustrating the potential change of the triode battery (A1a) of Example 15 observed during charge-discharge cycle.
Figure 21:
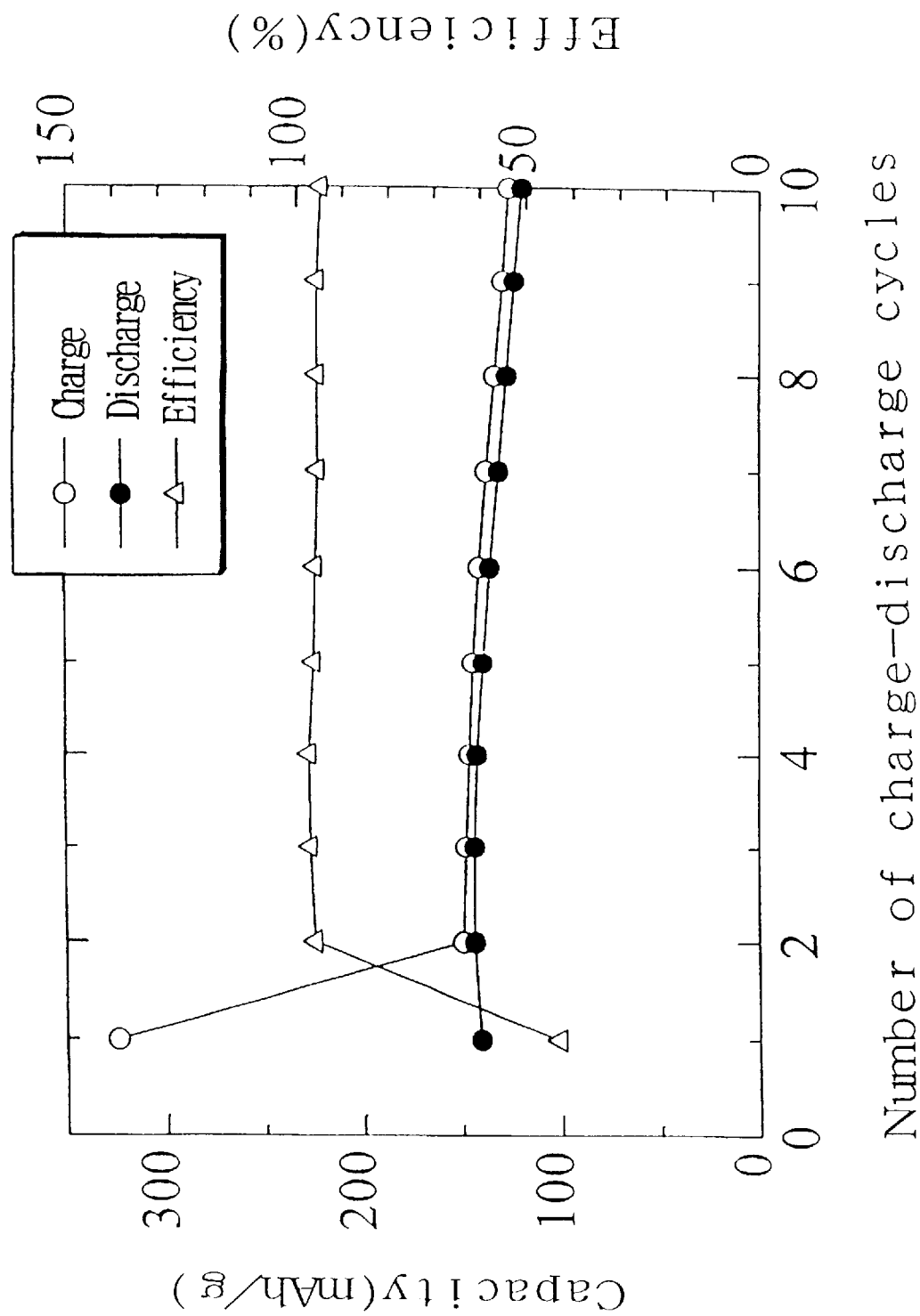
FIG. 21 is a graphical representation illustrating the capacity change of the triode battery (A1a) of Example 15 with the charge-discharge cycle.

Further, the battery was charged and discharged within a potential range between 2.5 V and 4.2 V. The potential change observed during the charge-discharge processes is shown in FIG. 20. The capacity change with the charge-discharge cycle is shown in FIG. 21 and Table 2. In the first charge-discharge cycle, the battery exhibited a very high charge capacity, that is, about 320 mAh/g, with a constant potential. The charge capacity indicated that about 1.4 lithium were deintercalated from $Li_{2.14}Ni_{0.86}O_2$. The discharge potential of the battery gradually decreased. The battery exhibited a discharge capacity of about 140 mAh/g with little change during repeated charge-discharge cycles.

TABLE 2

| Cycle | Charge mAh/g | Discharge mAh/g | Efficiency % |
|---|---|---|---|
| 1 | 317.6 | 141.6 | 44.6 |
| 2 | 150.8 | 145.5 | 96.5 |
| 3 | 150.2 | 146.2 | 97.3 |
| 4 | 149.0 | 146.1 | 98.1 |
| 5 | 148.3 | 146.0 | 98.5 |
| 6 | 148.3 | 144.6 | 97.5 |
| 7 | 146.7 | 144.5 | 98.5 |
| 8 | 146.9 | 144.7 | 98.5 |
| 9 | 147.1 | 144.7 | 98.4 |
| 10 | 147.4 | 144.4 | 98.0 |

Example 16

A triode battery as shown in FIG. 17 was fabricated in the following manner. The positive-electrode active material A1a was pulverized in a mortar, and mixed with about 1 wt % of acetylene black as a conductive material and then with about 50 wt % of a powdery Teflon resin as a binder. The resulting mixture was molded into a pellet by means of a pelleting machine, and the pellet was crimped with a metal mesh for preparation of a positive-electrode 5. Metal lithium sheets each crimped with an Ni mesh were used as a negative-electrode 6 and a counter electrode 4. Used as an electrolyte 7 was a solution containing 1 mol/l $LiPF_6$ dissolved in a solvent mixture of 50 vol % of propylene carbonate and 50 vol % of tetrahydrofuran. The counter electrode 4, the positive-electrode 5, the negative-electrode 6 and the electrolyte 7 were incorporated in a glass cell 1 in the same manner as in Example 15. A charge-discharge test was performed on the battery thus fabricated. The potential range for the charge-discharge processes was 2.5 V. to 4.2 V.

The potential change observed when the battery was charged and discharged at a constant current is shown in Table 3. The battery of Example 16 had substantially the same characteristics as the battery of Example 15. More specifically, the battery exhibited very high charge-discharge capacities and a high charge-discharge efficiency.

TABLE 3

| Cycle | Charge mAh/g | Discharge mAh/g | Efficiency % |
|---|---|---|---|
| 1 | 314.4 | 138.7 | 43.3 |
| 2 | 149.3 | 142.6 | 96.2 |
| 3 | 148.7 | 143.3 | 97.2 |
| 4 | 147.5 | 143.2 | 97.4 |
| 5 | 146.8 | 143.1 | 96.4 |
| 6 | 146.8 | 141.7 | 96.0 |
| 7 | 145.2 | 141.6 | 95.4 |
| 8 | 145.4 | 141.8 | 95.5 |
| 9 | 145.7 | 141.8 | 95.5 |
| 10 | 145.9 | 141.5 | 94.7 |

Example 17

A triode battery as shown in FIG. 17 was fabricated in the following manner. The positive-electrode active material A5 prepared in Example 5 was pulverized in a mortar, and mixed with about 10 wt % of acetylene black as a conductive material and then with natural graphite and about 10 wt % of a powdery Teflon resin as a binder. The resulting mixture was molded into a pellet by means of a pelleting machine, and the pellet was crimped with a metal mesh for preparation of a positive-electrode 5. Metal lithium sheets each crimped with an Ni mesh were used as a counter electrode 4 and a negative-electrode 6. Used as an electrolyte 7 was a solution containing 1 mol/l $LiClO_4$ dissolved in a solvent mixture of 50 vol % of ethylene carbonate and 50 vol % of diethylene carbonate. The counter electrode 4, the positive-electrode 5, the negative-electrode 6 and the electrolyte 7 were incorporated in a glass cell 1. A charge-discharge test was performed on the battery thus fabricated. The fabrication process and the test were carried out in an Ar dry box.

Figure 22:
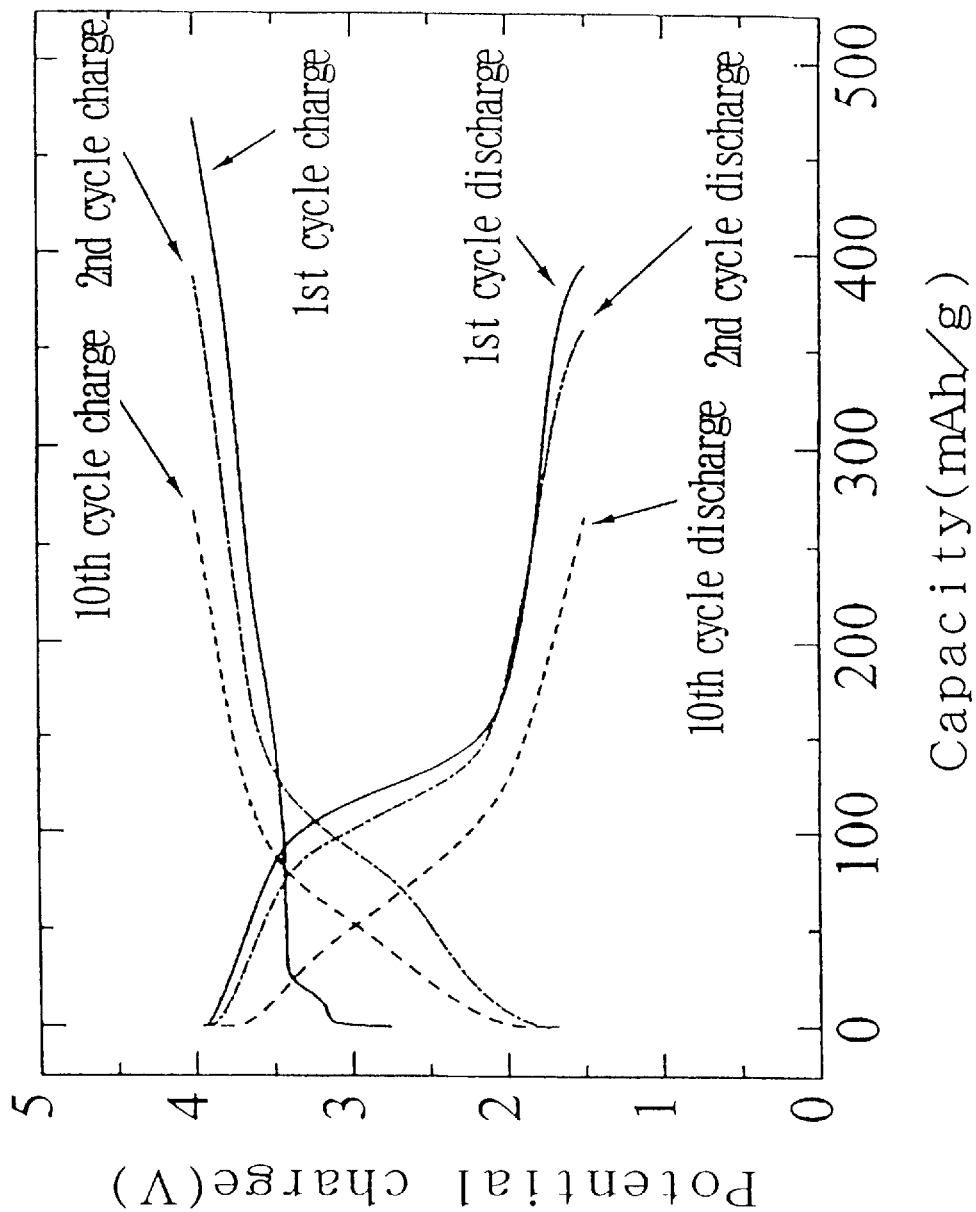
FIG. 22 is a graphical representation illustrating the potential change of the triode battery (A5) of Example 17 observed during charge-discharge cycle.
Figure 23:
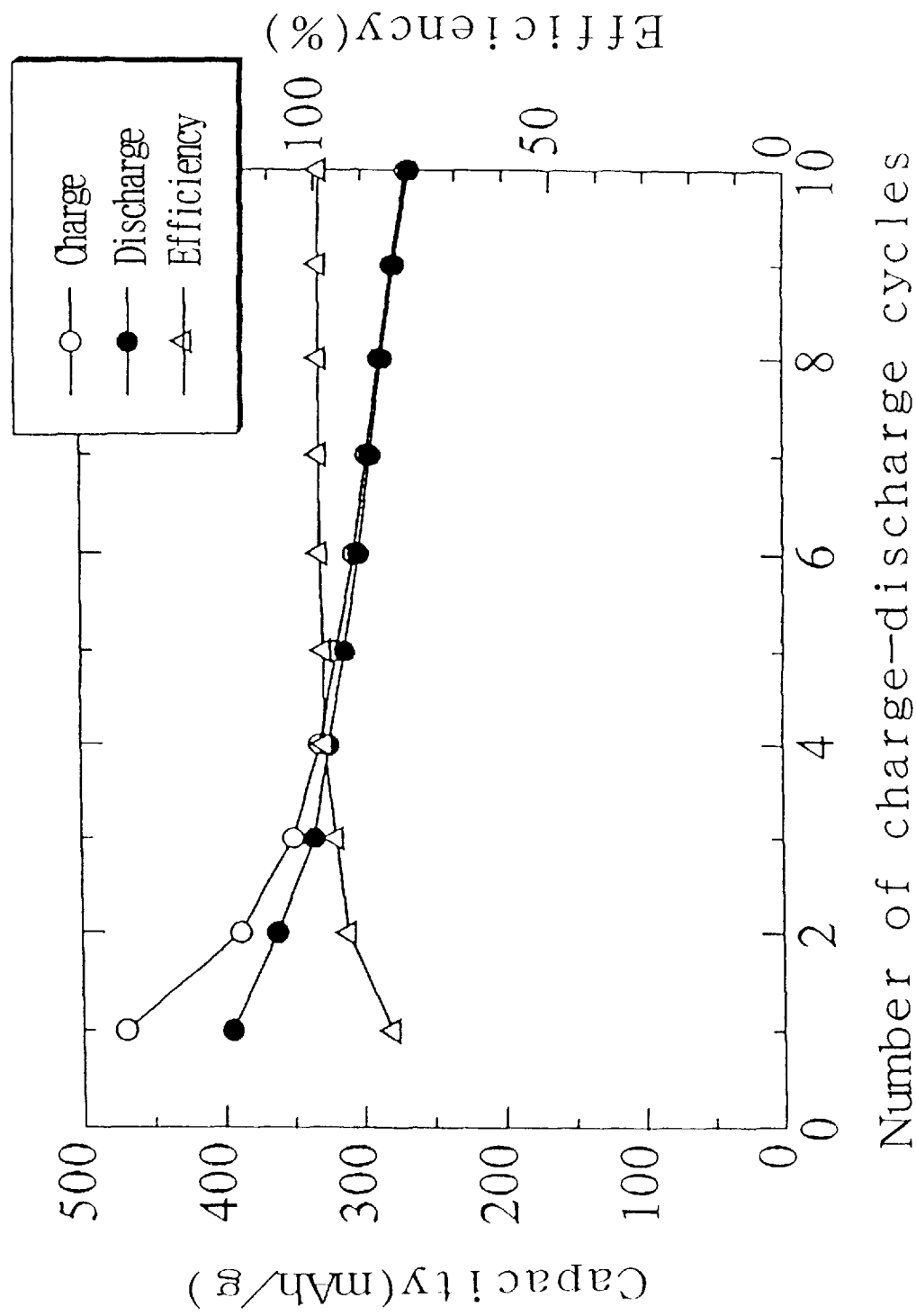
FIG. 23 is a graphical representation illustrating the capacity change of the triode battery (A5) of Example 17 with the charge-discharge cycle.

The battery was charged and discharged within a potential range between 1.5 V and 4.2 V at a constant current. The potential change observed during the charge-discharge processes is shown in FIG. 22. The capacity change with the charge-discharge cycle is shown in FIG. 23 and Table 4. In the first charge-discharge cycle, the battery exhibited very high charge-discharge capacities, that is, a charge capacity of about 460 mAh/g and a discharge capacity of about 400 mAh/g. The first charge-discharge capacities indicated that about 1.9 lithium were deintercalated from $Li_2NiO_{2.2}$ during the charge process and about 1.6 lithium were inserted back during the discharge process. In addition, the charge-discharge efficiency was very high.

TABLE 4

| Cycle | Charge mAh/g | Discharge mAh/g | Efficiency % |
|---|---|---|---|
| 1 | 469.8 | 393.9 | 83.9 |
| 2 | 387.4 | 361.0 | 93.2 |
| 3 | 349.3 | 334.2 | 95.7 |
| 4 | 330.3 | 323.9 | 98.1 |
| 5 | 318.1 | 312.5 | 98.2 |
| 6 | 305.5 | 302.0 | 98.9 |
| 7 | 296.2 | 293.5 | 99.1 |
| 8 | 287.3 | 284.7 | 99.1 |
| 9 | 277.9 | 275.6 | 99.2 |
| 10 | 267.6 | 264.7 | 98.9 |

Figure 24:
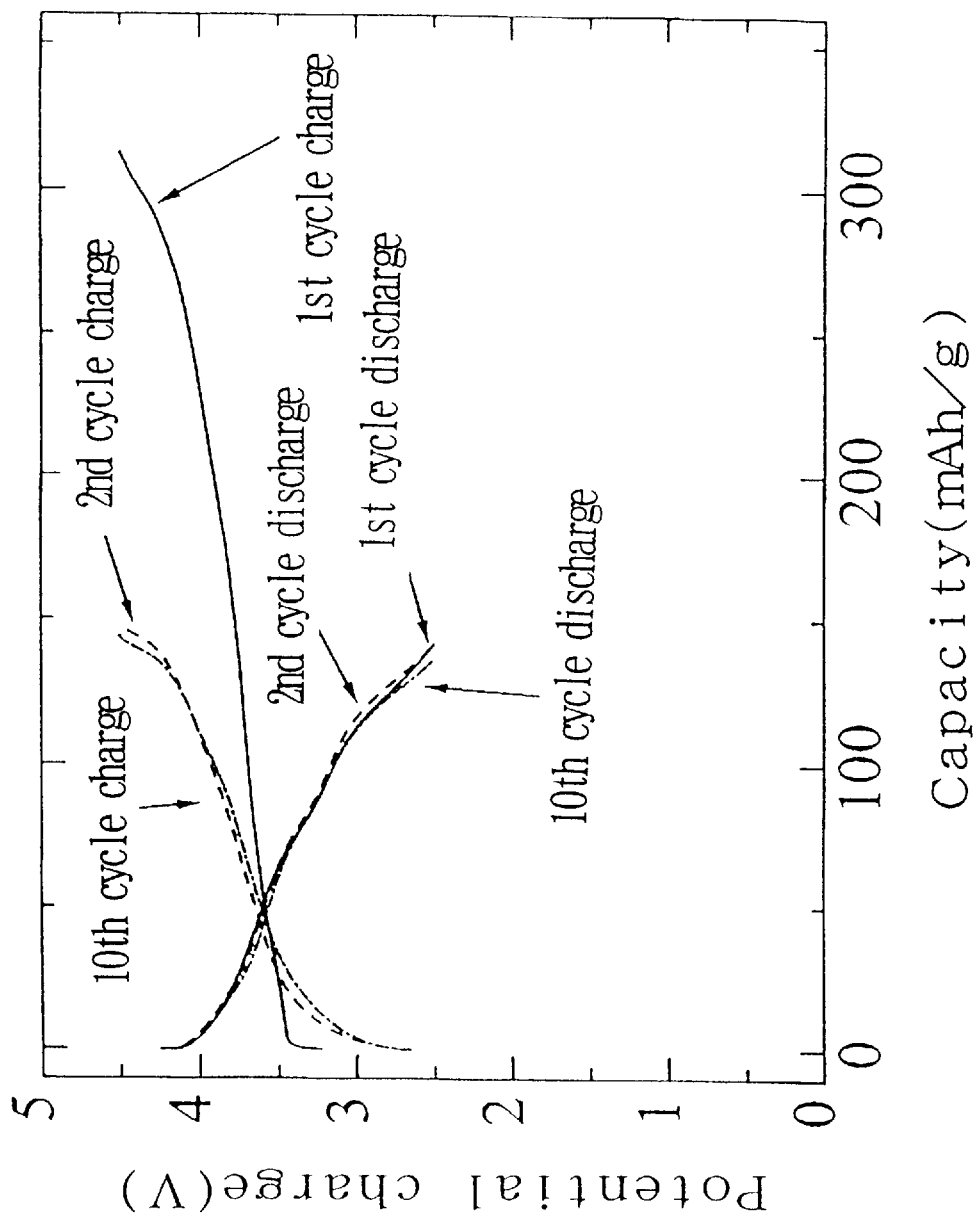
FIG. 24 is a graphical representation illustrating the potential change of the triode battery (A5) of Example 17 observed during charge-discharge cycle.
Figure 25:
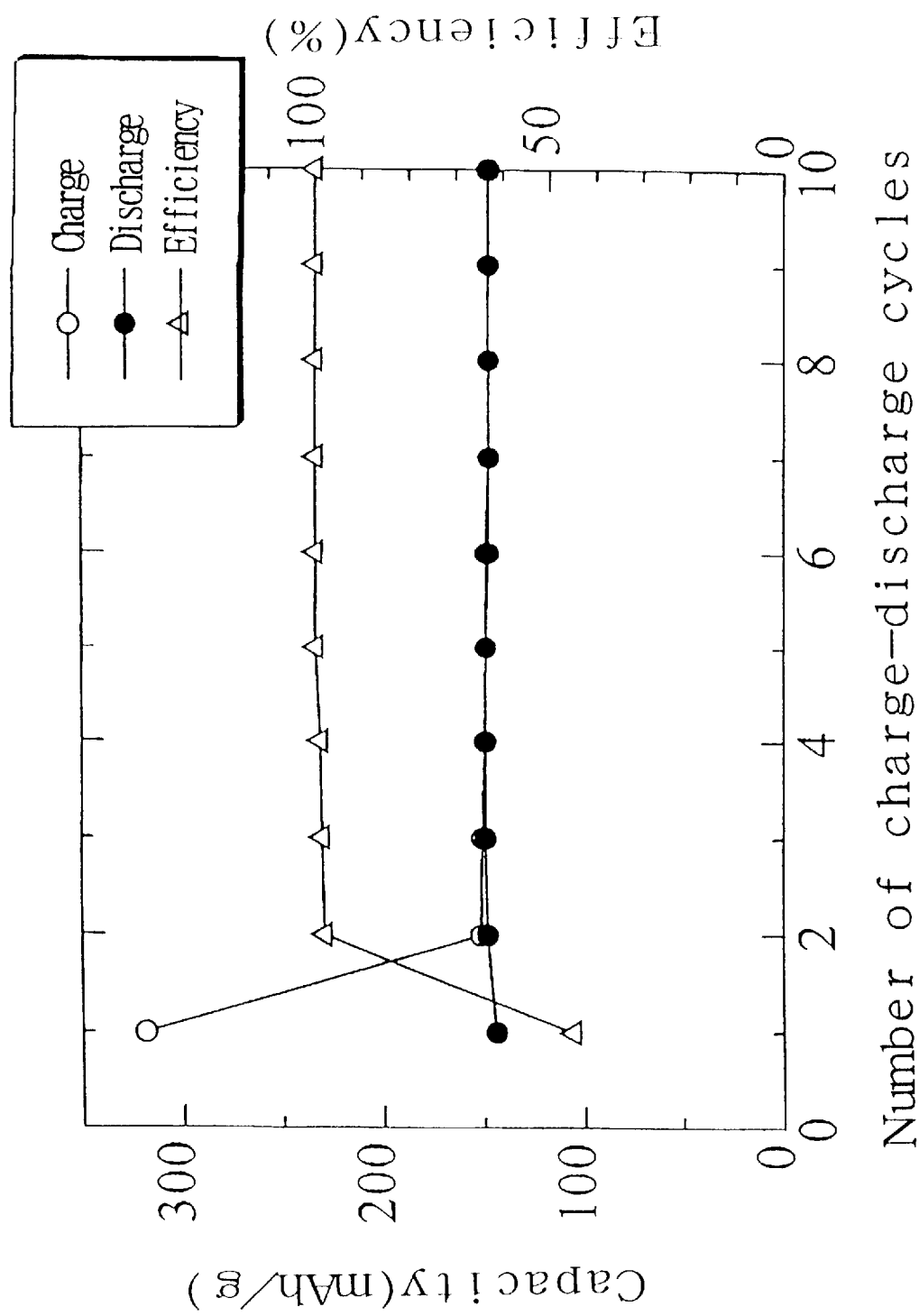
FIG. 25 is a graphical representation illustrating the capacity change of the triode battery (A5) of Example 17 with the charge-discharge cycle.

Further, the battery was charged and discharged within a potential range between 2.5 V and 4.2 V. The potential change observed during the charge-discharge processes is shown in FIG. 24. The capacity change with the charge-discharge cycle is shown in FIG. 25 and Table 5. In the first charge-discharge cycle, the battery exhibited a very high charge capacity, that is, about 350 mAh/g, with a constant potential. The charge capacity indicated that about 1.4 lithium were deintercalated from $Li_2NiO_{2.2}$. The discharge potential of the battery gradually decreased. The battery exhibited a discharge capacity of about 160 mAh/g with little change during repeated charge-discharge cycles.

TABLE 5

| Cycle | Charge mAh/g | Discharge mAh/g | Efficiency % |
|---|---|---|---|
| 1 | 320.7 | 134.6 | 42.0 |
| 2 | 143.4 | 138.4 | 96.5 |
| 3 | 142.8 | 139.0 | 97.3 |
| 4 | 141.7 | 138.9 | 98.1 |
| 5 | 141.0 | 138.9 | 98.5 |
| 6 | 141.1 | 137.5 | 97.5 |
| 7 | 139.5 | 137.4 | 98.5 |
| 8 | 139.7 | 137.6 | 98.5 |
| 9 | 139.9 | 137.6 | 98.4 |
| 10 | 140.2 | 137.3 | 98.0 |

Example 18

A triode battery as shown in FIG. 17 was fabricated in the following manner. The positive-electrode active material A6 prepared in Example 6 was pulverized in a mortar, and mixed with about 1 wt % of acetylene black as a conductive material and then with about 50 wt % of a powdery Teflon resin as a binder. The resulting mixture was molded into a pellet by means of a pelleting machine, and the pellet was crimped with a metal mesh for preparation of a positive-electrode 5. Metal lithium sheets each crimped with an Ni mesh were used as a negative-electrode 6 and a counter electrode 4. Used as an electrolyte 7 was a solution containing 1 mol/l $LiPF_6$ dissolved in a solvent mixture of 50 vol % of propylene carbonate and 50 vol % of tetrahydrofuran. The counter electrode 4, the positive-electrode 5, the negative-electrode 6 and the electrolyte 7 were incorporated in a glass cell 1 in the same manner as in Example 17. A charge-discharge test was performed on the battery thus fabricated.

The battery was charged and discharged within a potential range between 2.5 V and 4.2 V at a constant current. The capacity change with the charge-discharge cycle is shown in Table 6. The battery of Example 18 had substantially the same characteristics as the battery of Example 17. Further, the charge-discharge efficiency was very high.

TABLE 6

| Cycle | Charge mAh/g | Discharge mAh/g | Efficiency % |
|---|---|---|---|
| 1 | 318.9 | 144.2 | 45.2 |
| 2 | 151.4 | 148.2 | 98.2 |
| 3 | 150.8 | 148.9 | 98.6 |
| 4 | 149.6 | 148.8 | 99.0 |
| 5 | 148.9 | 148.8 | 100.0 |
| 6 | 148.9 | 147.3 | 100.0 |
| 7 | 147.3 | 147.2 | 100.0 |
| 8 | 147.4 | 147.4 | 100.0 |
| 9 | 147.7 | 147.4 | 100.0 |
| 10 | 148.0 | 147.1 | 100.0 |

Example 19

Figure 26:
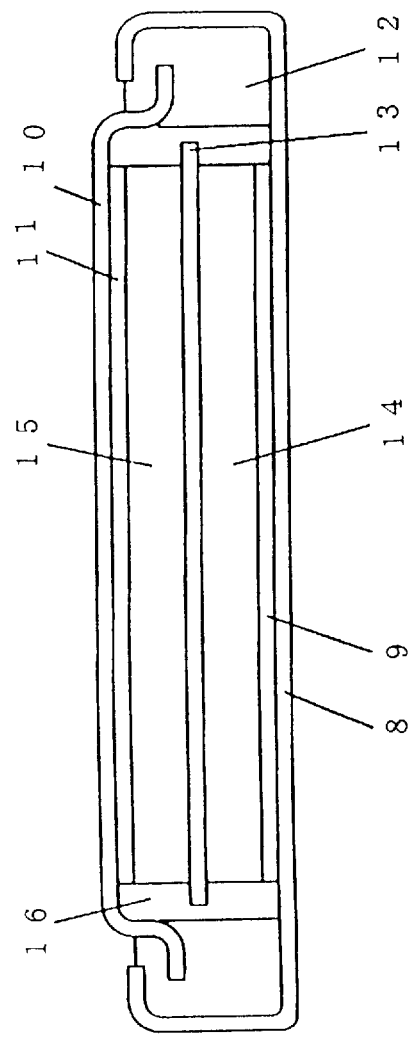
FIG. 26 is a graphical representation illustrating the basic structure of coin-type batteries fabricated in Examples 19 and 20.

FIG. 26 is a graphical representation illustrating an exemplary coin-type battery according to the present invention. In FIG. 26, there are shown a positive-electrode case 8, a positive-electrode collector 9, a negative-electrode case 10, a negative-electrode collector 11, a packing 12, and a separator 13.

The positive-electrode active material A2a was pulverized in a mortar, and mixed with about 50 wt % of acetylene black as a conductive material and then with about 1 wt % of a powdery Teflon resin as a binder. The resulting mixture was molded into a pellet by means of a pelleting machine, and the pellet was crimped with a metal mesh for preparation of a positive-electrode 14. For preparation of a negative-electrode 15, graphite powder was mixed with about 1 wt % of a powdery Teflon resin as a binder, then the mixture was molded into a pellet by means of a pelleting machine, and the pellet was crimped with a metal mesh. Used as an electrolyte 16 was a solution containing 0.5 mol/l $LiPF_6$ dissolved in a solvent mixture of 10 vol % of propylene carbonate and 90 vol % of tetrahydrofuran. The positive-electrode 14, the negative-electrode 15 and the electrolyte 16 were incorporated in a coin-type cell. A charge-discharge test was performed on the battery thus fabricated. The potential range for the charge-discharge processes was 2.5 V to 4.2 V. The fabrication process and the test were carried out in an Ar dry box.

The capacity change observed during the charge-discharge processes is shown in Table 7. The battery of Example 19 had substantially the same characteristics as the battery of Example 15. The battery exhibited a high capacity and a high charge-discharge efficiency.

TABLE 7

| Cycle | Charge mAh/g | Discharge mAh/g | Efficiency % |
| --- | --- | --- | --- |
| 1 | 311.3 | 143.0 | 44.6 |
| 2 | 147.8 | 147.0 | 99.1 |
| 3 | 147.2 | 147.6 | 100.1 |
| 4 | 146.0 | 147.5 | 100.3 |
| 5 | 145.3 | 147.5 | 99.3 |
| 6 | 145.4 | 146.1 | 98.9 |
| 7 | 143.8 | 145.9 | 98.3 |
| 8 | 143.9 | 146.2 | 98.4 |
| 9 | 144.2 | 146.2 | 98.4 |
| 10 | 144.4 | 145.9 | 97.5 |

Comparative Example 15

A triode battery was fabricated in substantially the same manner as in Example 15 except that $LiNiO_2$ was employed for the positive-electrode, and the battery thus fabricated was charged and discharged at a constant current. It is noted that $LiNiO_2$ was prepared by sufficiently mixing LiOH and NiO and the calcing resulting mixture at 750° C. in a stream of oxygen for 12 hours. The potential range for the charge-discharge processes was 2.5 V to 4.2 V. Changes in the charge capacity, the discharge capacity and the charge-discharge efficiency are shown in Table 8. A comparison between Tables 2 and 8 indicates that the battery employing $Li_{2.14}Ni_{0.86}O_2$ exhibited a higher capacity and more excellent cycle characteristics than a prior art battery employing $LiNiO_2$.

TABLE 8

| Cycle | Charge mAh/g | Discharge mAh/g | Efficiency % |
| --- | --- | --- | --- |
| 1 | 204.5 | 155.9 | 76.2 |
| 2 | 152.9 | 152.4 | 99.7 |

TABLE 8-continued

| Cycle | Charge mAh/g | Discharge mAh/g | Efficiency % |
| --- | --- | --- | --- |
| 3 | 150.3 | 150.0 | 99.8 |
| 4 | 149.0 | 148.1 | 99.4 |
| 5 | 147.5 | 146.1 | 99.1 |
| 6 | 144.4 | 142.6 | 98.7 |
| 7 | 140.4 | 140.1 | 99.8 |
| 8 | 137.9 | 137.7 | 99.9 |
| 9 | 136.4 | 135.4 | 99.3 |
| 10 | 133.3 | 132.5 | 99.4 |

Example 20

A coin-type battery as shown in FIG. 26 was fabricated in the following manner. The positive-electrode active substance A7 was pulverized in a mortar, and mixed with about 50 wt % of acetylene black as a conductive material and then with natural graphite and about 1 wt % of a powdery Teflon resin as a binder. The resulting mixture was molded into a pellet by means of a pelleting machine, and the pellet was crimped with a metal mesh for preparation of a positive-electrode 14. For preparation of a negative-electrode 15, natural graphite powder was mixed with about 1 wt % of a powdery Teflon resin as a binder, then the mixture was molded into a pellet by means of a pelleting machine, and the pellet was crimped with a metal mesh. Used as an electrolyte 16 was a solution containing 0.5 mol/l $LiPF_6$ dissolved in a solvent mixture of 10 vol % of propylene carbonate and 90 vol % of tetrahydrofuran. The positive-electrode 14, the negative-electrode 15 and the electrolyte 16 were incorporated in a coin-type cell. A charge-discharge test within a potential range between 2.5 V and 4.2 V was performed on the battery thus fabricated. The fabrication process and the test were carried out in an Ar dry box.

The capacity change observed during the charge-discharge processes are shown in Table 9. The battery of Example 20 had substantially the same characteristics as the battery of Example 17. The battery exhibited a high capacity and a high charge-discharge efficiency.

TABLE 9

| Cycle | Charge mAh/g | Discharge mAh/g | Efficiency % |
| --- | --- | --- | --- |
| 1 | 311.4 | 138.8 | 44.6 |
| 2 | 147.9 | 142.7 | 96.5 |
| 3 | 147.2 | 143.3 | 97.3 |
| 4 | 146.1 | 143.2 | 98.1 |
| 5 | 145.4 | 143.2 | 98.5 |
| 6 | 145.4 | 141.8 | 97.5 |
| 7 | 143.8 | 141.7 | 98.5 |
| 8 | 144.0 | 141.9 | 98.5 |
| 9 | 144.3 | 141.9 | 98.4 |
| 10 | 144.5 | 141.6 | 98.0 |

Comparative Example 16

A triode battery was fabricated in substantially the same manner as in Example 17 except that $LiNiO_2$ was employed for the positive-electrode, and the battery thus fabricated was charged and discharged at a constant current. It is noted that $LiNiO_2$ was prepared by sufficiently mixing LiOH and NiO and the calcing resulting mixture at 750° C. in a stream of oxygen for 12 hours. The potential range for the charge-discharge processes was 2.5 V to 4.2 V. Changes in the charge capacity, the discharge capacity and the charge-discharge efficiency are shown in Table 10. A comparison between Tables 5 and 10 indicates that the battery employing $Li_2NiO_{2+y}$ exhibited a higher capacity than a prior art battery employing $LiNiO_2$.

TABLE 10

| Cycle | Charge mAh/g | Discharge mAh/g | Efficiency % |
|---|---|---|---|
| 1 | 204.5 | 155.9 | 76.2 |
| 2 | 152.9 | 152.4 | 99.7 |
| 3 | 150.3 | 150.0 | 99.8 |
| 4 | 149.0 | 148.1 | 99.4 |
| 5 | 147.5 | 146.1 | 99.1 |
| 6 | 144.4 | 142.6 | 98.7 |
| 7 | 140.4 | 140.1 | 99.8 |
| 8 | 137.9 | 137.7 | 99.9 |
| 9 | 136.4 | 135.4 | 99.3 |
| 10 | 133.3 | 132.5 | 99.4 |

In accordance with the present invention, a battery exhibiting a higher capacity can be provided by employing, instead of $LiNiO_2$, as a positive-electrode active material a lithium nickel composite oxide $Li_{2+x}Ni_{1-x}O_{2+y}$ ($0.0 \leq x \leq 1/7$, $0.0 \leq y < 0.3$, excluding the case where x=y=0) which is prepared from a less expensive nickel material.

What we claim is:

1. A lithium nickel composite oxide represented by the composition formula (I): $Li_{2+x}Ni_{1-x}O_{2+y}$ wherein the $0.0 < x \leq 1/7$ and $0.0 \leq y < 0.3$.

2. The lithium nickel composite oxide according to claim 1 wherein the composite oxide of the formula(I) has a structure such that $NiO_4$ square planer coordination units share their opposite sides to form a linear chain which is located parallel to another linear chain of $NiO_4$ square planer coordination units with their planes facing opposite to each other.

3. The lithium nickel composite oxide according to claim 1, wherein the composite oxide of formula (I) has a structure such that $NiO_4$ square planer coordination units share their opposite sides to form a linear chain, oxygen being inserted into some sites between the linear chains and an $NiO_4$ square planer coordination unit and an oxygen form a pyramid-like $NiO_5$ pentahedral unit with the oxygen located at an apex thereof, thereby forming an interconnected Ni—O two dimensional plane.

4. The lithium nickel composite oxide according to claim 1, which belongs to the Space Group Immm.

5. The lithium nickel composite oxide according to claim 1, wherein X-ray diffraction patterns utilizing Cuk α beam each have peaks at $2\theta$ (°)=19.6±0.5, 25.6±0.5, 44.3±0.5, 45.3 ±0.5, 48.5±0.5 and 58.0±0.5.

6. The lithium nickel composite oxide according to claim 1, wherein the X-ray diffraction patterns utilizing Cuk α beam each have peaks at $2\theta$ (°)=19.6±0.5, 25.6±0.5, 44.3±0.5, 45.3±0.5, 48.5±0.5 and 58.0±0.5 with peak intensities thereof being 20 to 35, 100, 28 to 35, 18 to 22, 10 to 14, and 17 to 20, respectively, when the peak intensities are normalized with the maximum peak intensity at $2\theta$ (°)= 25.6±0.5 being regarded as 100.

7. A positive-electrode active material comprising a lithium nickel composite oxide represented by the composition formula (I): $Li_{2+x}Ni_{1-x}O_{2+y}$ wherein $0.0 < x \leq 1/7$ and $0.0 \leq y < 0.3$.

8. A nonaqueous secondary battery comprising a positive-electrode containing a lithium nickel composite oxide represented by the composition formula (I): $Li_{2+x}Ni_{1-x}O_{2+y}$ wherein $0.0 < x \leq 1/7$ and $0.0 < y < 0.3$ as an electrode active material, an electrode containing metal lithium absorbable material, and an ion conductor.

9. The nonaqueous secondary battery according to claim 8, wherein the negative-electrode is formed of a graphite material.

10. The nonaqueous secondary battery according to claim 8, wherein the negative-electrode is formed of a carbon material.

11. The nonaqueous secondary battery according to claim 8, wherein the ion conductor is a nonaqueous electrolyte solvent.

* * * * *